(12) United States Patent
Sato

(10) Patent No.: US 7,611,056 B2
(45) Date of Patent: Nov. 3, 2009

(54) IC CARD CONNECTOR

(75) Inventor: Shigeru Sato, Chiba (JP)

(73) Assignee: Yamaichi Electronics Co., Ltd., Tokyo (JP)

( * ) Notice: Subject to any disclaimer, the term of this patent is extended or adjusted under 35 U.S.C. 154(b) by 211 days.

(21) Appl. No.: 11/393,860

(22) Filed: Mar. 31, 2006

(65) Prior Publication Data

US 2006/0219785 A1 Oct. 5, 2006

(30) Foreign Application Priority Data

Apr. 1, 2005 (JP) ............... 2005-106769

(51) Int. Cl.
*G06K 7/06* (2006.01)
(52) U.S. Cl. .............. 235/441; 235/380; 439/630
(58) Field of Classification Search .......... 235/441, 235/492; 439/630, 635, 640
See application file for complete search history.

(56) References Cited

U.S. PATENT DOCUMENTS

| | | |
|---|---|---|
| 4,404,464 A | 9/1983 | Moreno |
| 4,421,372 A | 12/1983 | Golden |
| 4,722,693 A | 2/1988 | Rose |
| 5,035,633 A | 7/1991 | Kobayashi et al. |
| 5,179,504 A | 1/1993 | Kitahara |
| 5,207,598 A | 5/1993 | Yamada et al. |
| 5,300,763 A | 4/1994 | Ito et al. |
| 5,490,791 A | 2/1996 | Yamada et al. |
| 5,563,397 A | 10/1996 | Fujimoto et al. |
| 5,876,218 A | 3/1999 | Liebenow et al. |
| 6,056,573 A | 5/2000 | Nishioka |
| 6,068,500 A | 5/2000 | Kantner |
| 6,109,940 A | 8/2000 | Chad et al. |
| 6,123,557 A | 9/2000 | Wang et al. |
| 6,129,572 A | 10/2000 | Feldman et al. |
| 6,135,809 A | 10/2000 | Asakawa |
| 6,203,378 B1 | 3/2001 | Shobara et al. |
| 6,345,760 B1 | 2/2002 | Eason et al. |
| 6,361,369 B1 | 3/2002 | Kondo et al. |
| 6,386,920 B1 | 5/2002 | Sun |

(Continued)

FOREIGN PATENT DOCUMENTS

CN 2520582 Y 11/2002

(Continued)

OTHER PUBLICATIONS

English Abstract for Japanese Publication No. 08055661, dated Feb. 27, 1996, Application No. 06219371, application date Aug. 10, 1994, for inventor Yoshikawa Takamasa, Title: Card Connecting Adaptor.

(Continued)

*Primary Examiner*—Daniel A Hess
*Assistant Examiner*—Rafferty Kelly
(74) *Attorney, Agent, or Firm*—Finnegan, Henderson, Farabow, Garrett & Dunner, LLP

(57) ABSTRACT

When inserting a MEMORY STICK MS, the tip portion of the MEMORY STICK MS rotates and detrudes the contact pressing plate, so that contact portions of contact terminals 14$ai$ for a SD card SD are pressed down by a rim of slits 20$ai$ of the contact pressing plate 20 up to a position where the contact portions do not interfere with the MEMORY STICK MS.

10 Claims, 26 Drawing Sheets

U.S. PATENT DOCUMENTS

| | | |
|---|---|---|
| 6,399,906 B1 | 6/2002 | Sato et al. |
| 6,402,529 B2 | 6/2002 | Saito et al. |
| 6,413,108 B2 | 7/2002 | Centefonte |
| 6,457,647 B1 | 10/2002 | Kurihashi et al. |
| 6,468,101 B2 | 10/2002 | Suzuki |
| 6,482,029 B2 | 11/2002 | Nishimura |
| 6,503,092 B1 | 1/2003 | Sato |
| 6,511,350 B1 | 1/2003 | Ito et al. |
| 6,524,137 B1 | 2/2003 | Liu et al. |
| 6,527,590 B2 | 3/2003 | Oguchi |
| 6,547,601 B2 * | 4/2003 | Oguchi ............... 439/630 |
| 6,601,766 B2 | 8/2003 | Nakagawa et al. |
| 6,607,404 B1 | 8/2003 | Ito et al. |
| 6,612,492 B1 | 9/2003 | Yen |
| 6,641,413 B2 | 11/2003 | Kurodu |
| 6,666,724 B1 | 12/2003 | Lwee |
| 6,699,053 B2 | 3/2004 | Kuroda |
| 6,699,061 B2 | 3/2004 | Abe et al. |
| 6,700,788 B2 | 3/2004 | Matsushita et al. |
| 6,716,066 B1 | 4/2004 | Kuo |
| 6,780,062 B2 | 8/2004 | Liu et al. |
| 6,783,399 B2 | 8/2004 | Joung |
| 6,863,571 B2 | 3/2005 | Sato et al. |
| 6,913,492 B2 * | 7/2005 | Kuroda et al. ............ 439/631 |
| 6,976,879 B2 | 12/2005 | Shishikura et al. |
| 7,052,325 B2 * | 5/2006 | Lin et al. ............... 439/630 |
| 7,182,645 B2 | 2/2007 | Shimizu et al. |
| 2003/0157839 A1 | 8/2003 | Yamaguchi et al. |
| 2004/0026507 A1 | 2/2004 | Nagata et al. |
| 2004/0106326 A1 | 6/2004 | Hsieh |
| 2004/0110423 A1 | 6/2004 | Shishikura et al. |

FOREIGN PATENT DOCUMENTS

| | | | |
|---|---|---|---|
| DE | 3 937 383 A1 | 6/1990 | |
| DE | 4 139 482 | 6/1993 | |
| EP | 0 284 431 A2 | 9/1988 | |
| EP | 0 696 008 A2 | 2/1996 | |
| EP | 1 487 001 B1 | 9/1997 | |
| EP | 0 936 705 A2 | 8/1999 | |
| EP | 0 939 582 A2 | 9/1999 | |
| EP | 1 146 474 A1 | 10/2001 | |
| EP | 1 324 256 A1 | 7/2003 | |
| JP | 63-133473 | 6/1988 | |
| JP | 07-335321 | 12/1995 | |
| JP | 10-21348 | 1/1998 | |
| JP | 10-091729 | 4/1998 | |
| JP | 2784346 | 5/1998 | |
| JP | 10-187896 | 7/1998 | |
| JP | 11-316110 | 11/1999 | |
| JP | 2000-277200 | 6/2000 | |
| JP | 2000-251024 | 9/2000 | |
| JP | 2000-251025 | 9/2000 | |
| JP | 2001-135385 | 5/2001 | |
| JP | 2001-195546 | 7/2001 | |
| JP | 2001-237027 | 8/2001 | |
| JP | 2002-157056 | 5/2002 | |
| JP | 2002-164124 | 6/2002 | |
| JP | 2002-174532 | 6/2002 | |
| JP | 2002-289295 | 10/2002 | |
| JP | 2003-288962 | 10/2003 | |
| JP | 2003-317858 | 11/2003 | |
| JP | 2004-58232 | 2/2004 | |
| JP | 2004-071257 | 3/2004 | |
| JP | 2004-95234 | 3/2004 | |
| JP | 2004-193111 | 7/2004 | |
| JP | 2004-214119 | 7/2004 | |
| JP | 2004-311123 | 11/2004 | |
| JP | 2005-011666 | 1/2005 | |
| JP | 2005-044780 | 2/2005 | |
| JP | 2005-135696 | 5/2005 | |

OTHER PUBLICATIONS

European Patent Office Search Report dated Mar. 1, 2004, for European Patent Application No. 00971781.0.

International search Report Application No. PCT/JP00/007762, dated Feb. 6, 2001 from the European Patent Office.

Official Action from Japanese Patent Office for Application No. 2003-385753, mailed Jun. 14, 2005.

Office Action dated Jul. 18, 2008 issued in the corresponding Japanese Application No. 2005-106769.

Office Action dated Jun. 6, 2008 in corresponding Chinese Patent Application No. 2006-100670367.

* cited by examiner

IC CARD CONNECTOR

This application claims priority from Japanese Patent Application No. 2005-106769 filed Apr. 1, 2005, which is incorporated hereinto by reference.

BACKGROUND OF THE INVENTION

1. Field of the Invention

The present invention relates to an IC card connector that electrically connects several different kinds of IC cards respectively, to be removably inserted in a multiple card accommodation.

2. Description of the Related Art

In electronic apparatuses recently developed, in general, various functions are expanded thereto by mounting an IC card, such as an MMC™ (MULTI MEDIA CARD), an SD (secure digital) card, or a MEMORY STICK®, with a built-in CPU or a memory IC via an IC card connector.

Also, in the IC card connector, for example, as disclosed in Japanese Patent Application Laid-open No. 2004-193111, there is a proposal in that a multiple card accommodation having a slot to be used in common for loading/unloading each IC cards, is provided on the common plane in order to use a plurality of IC cards of mutually different shapes which are mounted in the same electronic apparatus (Ref. FIG. 45 accompanying the cited document).

In such an IC card connector having the multiple card accommodation, each card accommodation portions are sequentially formed in a line along the loading/unloading direction of the IC card. In each of card accommodation portions are respectively provided a group of a contact terminal corresponding to the contact pad of the IC cards. In such a structure, it is necessary to permit smooth insertion and removal of the IC cards while preventing the IC card from causing damage to a group of other unused contact terminal upon inserting or removing each IC cards through the slot used in common.

For example, as disclosed in Japanese Patent Application Laid-open No. 2004-095234, there is a proposal in that an IC card connector includes a sliding member which bears down on the contact portions of the group of contact terminals up to a position where the contact portions do not make contact with the contact pad of the IC card in order to avoid damage to the contact terminal due to contact with an IC card in a set of contact terminals disposed on the side closer to the common slot upon inserting or removing each IC cards. The sliding member disposed at the set of contact terminals side, is slidably disposed along loading/unloading direction of the IC card, and has an oblique cutaway portion at its tip portion for biasing an end of the contact portions of each contact terminals downward in contact therewith.

Also, as disclosed in Japanese Patent No. 02784346, there is a proposal in that an IC card connector includes a sliding member movably disposed between the contact portions of the contact terminals and the contact pad forming surface of the IC card being inserted or removed in order to avoid damage to the a group of contact terminals resulting from the insertion or removal of the IC card. The sliding member is provided with an opening to be selectively exposed so as to permit the contact pad of the IC card to contact the contact portions of the corresponding contact terminal, upon being moved together with the inserted IC card over a predetermined distance toward the contact portions of the group of contact terminals.

SUMMARY OF THE INVENTION

As disclosed in Japanese Patent No. 02784346, since the contact portions of the contact terminal always touch on a surface opposing the contact portions of the contact terminals in the sliding member which is movably disposed between the contact portions of the contact terminal and the contact pad forming surface of the IC card to be mounted and demounted, the contact portions of the contact terminal may wear because of the contact with the surface of the sliding member when the sliding member is repeatedly made to reciprocate.

Furthermore, as disclosed in Japanese Patent Application Laid-open No. 2004-095234 as above, it is necessary to ensure a sufficient travel amount of the sliding member when the sliding member slidably disposed along loading/unloading direction of the IC card, has an oblique cutaway portion at its tip portion for biasing an end of the contact portions of each contact terminals downward in contact therewith. More specifically, since the contact portions of the contact terminal are pressed by the tip portion of the sliding member, it is necessary for installing such a sliding member to ensure, between two contact terminals, a dimension that a stroke of the sliding member according to a amount of movement of an ejector member of a card ejecting mechanism and the entire length of the sliding member make.

However, especially when three or more different a group of contact terminals corresponding to each of the IC cards are sequentially provided in a line along loading/unloading direction of the IC card, supposing it adopts the above sliding member, an overall length of the card connector is relatively longer in order to ensure the necessary arrangement size of the sliding member, which is against the requirement of miniaturization in dimensions of the card connector.

In view of the foregoing problems, it is an object of the present invention to provide an IC card connector that electrically connects several different kinds of IC cards respectively, to be removably inserted in a multiple card accommodation, which can minimize damage to an unused contact terminal by collision of the IC card upon insertion or removal of the IC card, in addition can downsize the IC card connector.

To achieve the foregoing object, the present invention provides an IC card connector to be used in common for a plurality of IC cards of mutually different shapes via a common card inserting opening comprising: a card accommodation portion including a front section for accommodating one IC card and a rear section formed at a position farther from the card inserting opening than the front section so as to partially overlap with the front section for accommodating the other IC card; a group of front contact terminals and a group of a rear contact terminals disposed in the front section and the rear section respectively, for electrical connection with the one IC card and the other IC card respectively; and a contact pressing plate which is disposed such that an end portion thereof facing the card inserting opening is movably provided between the first section and a space, in the rear section, overlapping with the front section in a thickness direction of the one and the other IC card, and which selectively presses the group of contact portions of the front contact terminals down up to a predetermined position; wherein said contact pressing plate presses the group of contact portions of the front contact terminals down to a predetermined position according to insertion of the one IC card or the other IC card to be accommodated in said front section and rear section, thus to make the one IC card accommodated in the front section electrically connectible with the group of contact portions of the front contact terminals or to make the other IC card accommodated in the rear section electrically connectible with the rear contact terminals, or releases the a group of contact portions from the predetermined position according to ejecting operation of the one IC card or the other IC card accommodated in the front section and the rear section.

The present invention also provides an IC card connector comprising a multiple card accommodation including a first section for removably accommodating via a common card inserting opening a first IC card out of a plurality of IC cards of mutually different shapes, a second section for accommodating a second IC card, formed at a position farther from the card inserting opening than the first section in a line therewith and partially overlapping therewith, and a third section for accommodating a third IC card, formed at a position still farther from the card inserting opening than the first and the second sections, in a line therewith and partially overlapping therewith; a group of first contact terminals, a group of second contact terminals and a group of third contact terminals sequentially disposed in the loading/unloading direction of the IC card so as to correspond to the first section, the second section and the third section respectively, for electrical connection with the first IC card, the second IC card and the third IC card respectively; and a contact pressing plate slidably and rotational movably disposed midway between said group of the first contact terminals and the group of second contact terminals, so as to press the group of contact portions of the second contact terminals down to a predetermined position or to release the group of contact portions from the predetermined position according to insertion or removal operation of the second IC card or the third IC card.

As is apparent from the foregoing description, in the IC card connector according to the present invention, the contact pressing plate presses the group of contact portions of the front contact terminals down to a predetermined position upon insertion operation of the one IC card or the other IC card, thereby making the one IC card electrically connectible with the group of contact portions of the front contact terminals or to make the other IC card electrically connectible with the rear contact terminals. Accordingly, the group of contact portions of the front contact terminals are kept from contacting the other IC card when inserting or removing the other IC card, which allows minimizing a damage to an unused contact terminal by collision of the IC card upon insertion or removal. Moreover, the contact pressing plate is disposed such that an end portion thereof facing the card slot can move between the front section and a space, in the rear section, overlapping with the front section in a thickness direction of the front and the rear IC card, which permits making the IC card connector smaller in dimensions.

The above and other objects, effects, features and advantages of the present invention will become more apparent from the following description of embodiments thereof taken in conjunction with the accompanying drawings.

DETAILED DESCRIPTION OF PREFERRED EMBODIMENTS

Figure 2:
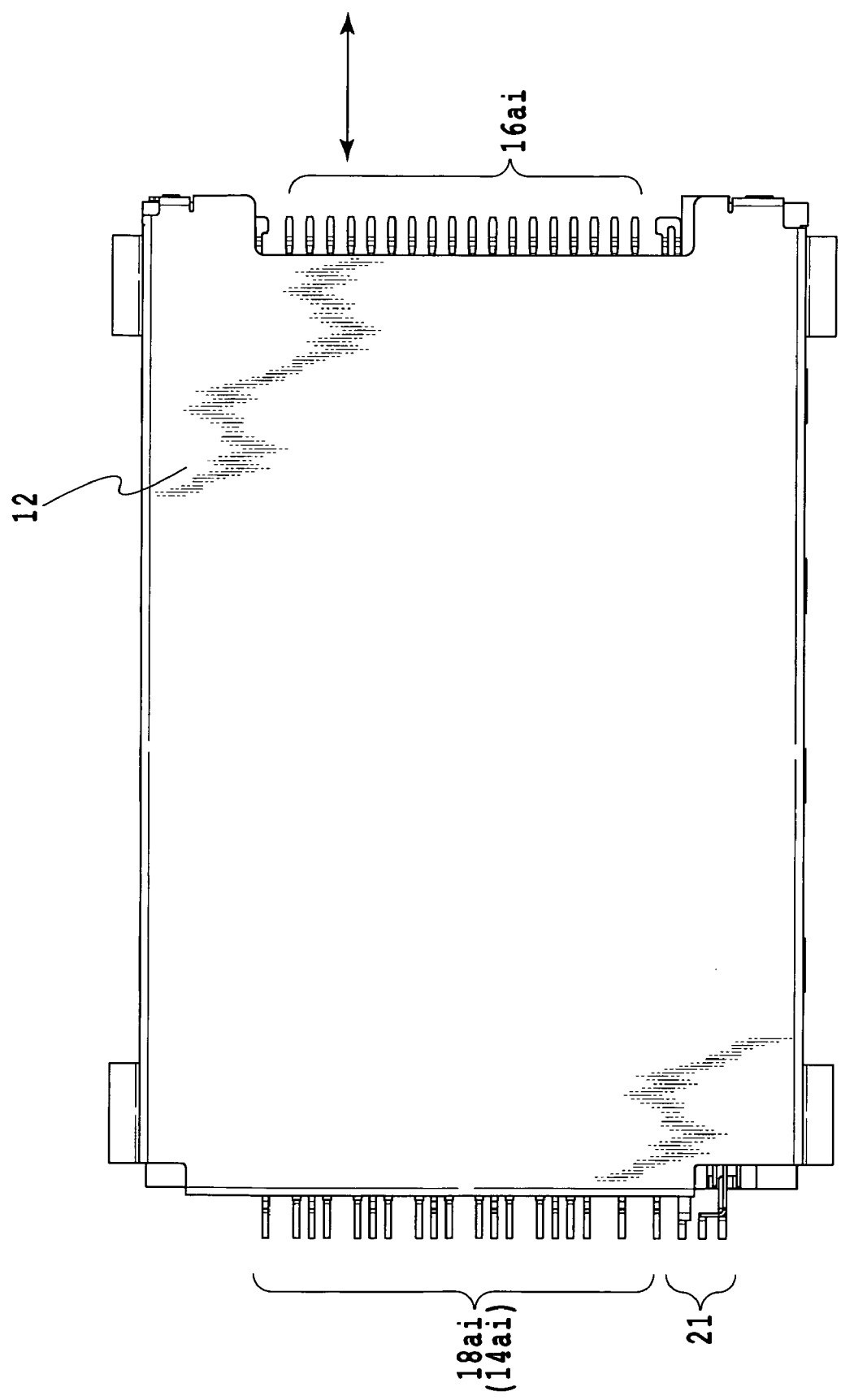
FIG. 2 is a plan view showing an outer appearance of an embodiment of the IC card connector according to the present invention.
Figure 3:
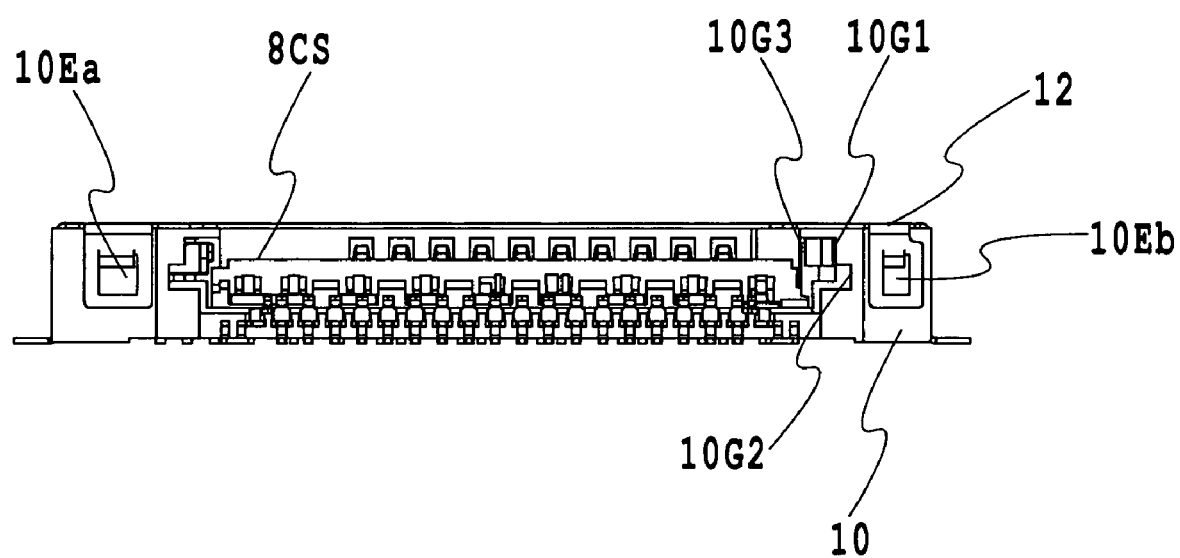
FIG. 3 is a front view of the IC card connector of an embodiment shown in FIG. 2, seen from the side with a card slot.

FIGS. 2 and 3 respectively depict an outer appearance of an embodiment of an IC card connector according to the present invention.

The IC card connector shown in FIG. 2 is designed to be implemented on a wiring board (not shown) in an electronic apparatus such as a printer, a mobile phone, a PDA or a digital camera. One of four types of IC cards, namely a MEMORY STICK® corresponding to the third IC card, an SD (secure digital) card corresponding to the second IC card, an MMC™ (MULTI MEDIA CARD), and an xD-PICTURE CARD™ (hereinafter, referred to as XD card) corresponding to the first IC card, can be selectively mounted on the IC card connector as described later.

The IC card connector serves to electrically connect an electrode portion of each IC cards removably mounted to a card accommodation thereof, for example in a direction indicated by an arrow in FIG. 2, with a connection terminal of a signal input and output substrate disposed inside the given electronic apparatus.

Figure 14:
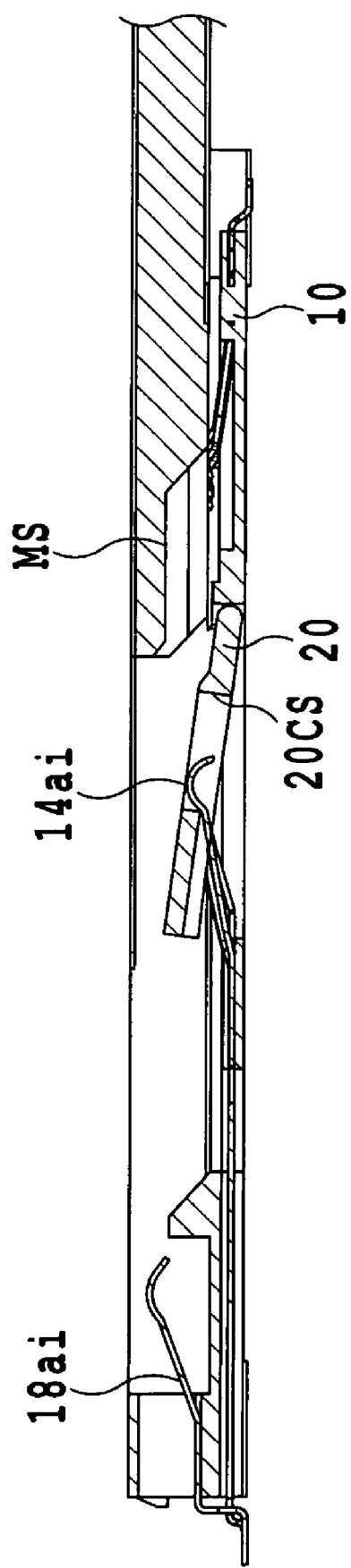
FIG. 14 is a cross-sectional view made available for explaining an operation of the IC card connector of an embodiment shown in FIG. 2 with the MEMORY STICK mounted thereto.
Figure 16:
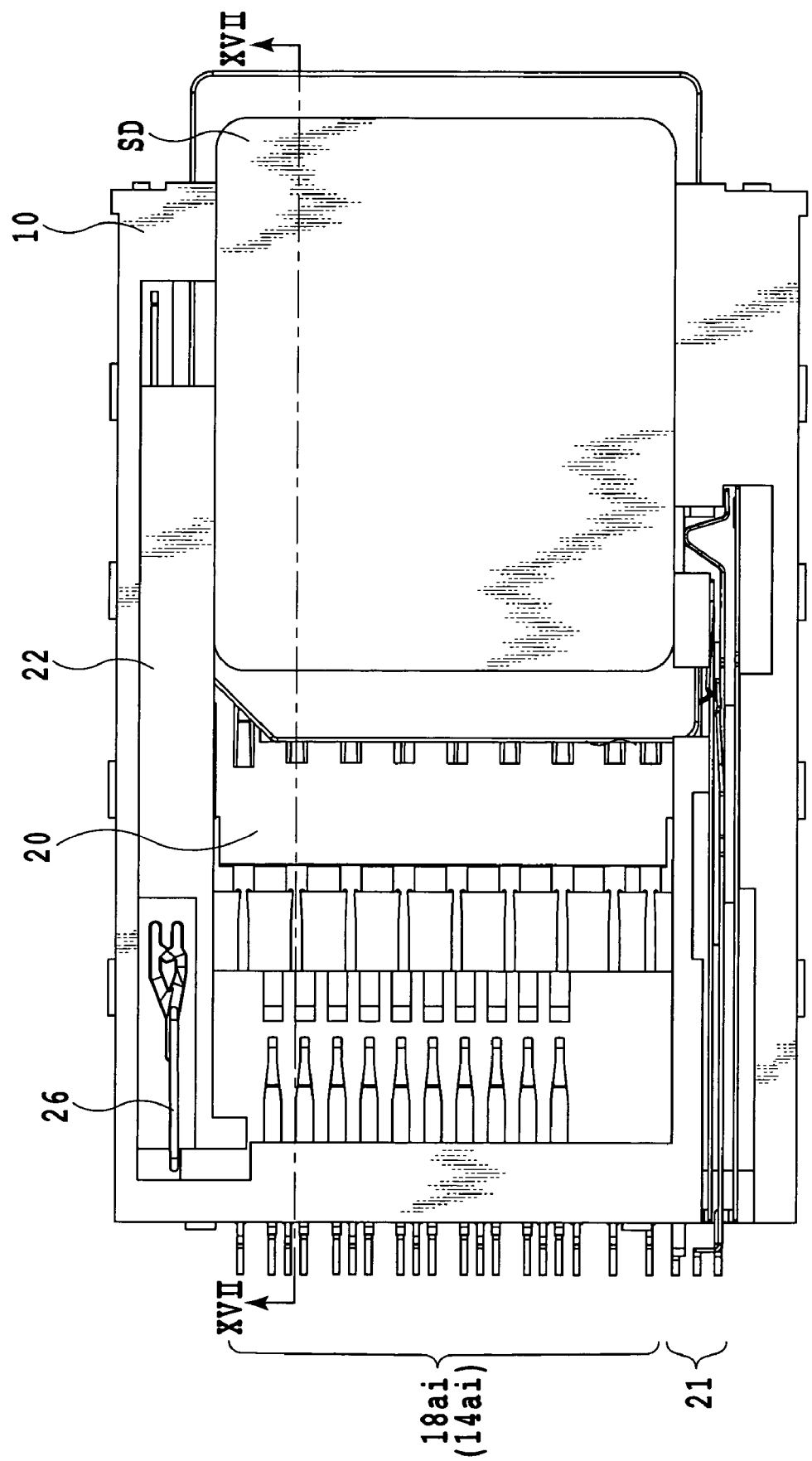
FIG. 16 is a plan view showing the IC card connector of an embodiment shown in FIG. 2, with an SD card mounted thereto.

The MEMORY STICK MS (Ref. FIG. 14) is narrower in width than that of the SD card SD as described later, but has a larger dimension in the longitudinal direction than that of the SD card SD. The SD card SD (Ref. FIG. 16) is provided with a plurality of contact pads formed on one of the surfaces at a front edge with one of the corners chamfered, so as to correspond to an array of contact terminals as described later. On the both sides thereof, a notch portion is formed so as to oppose each other. In one of the notch portions, a write-protect button is movably disposed. The MMC™ card, not shown, is of an identical width and entire length to those of the SD card SD, except for thickness of the card and number of the contact pads. The MMC card is slightly thinner than that of the SD card SD and has fewer contact pads than those of the SD card SD.

Figure 23:
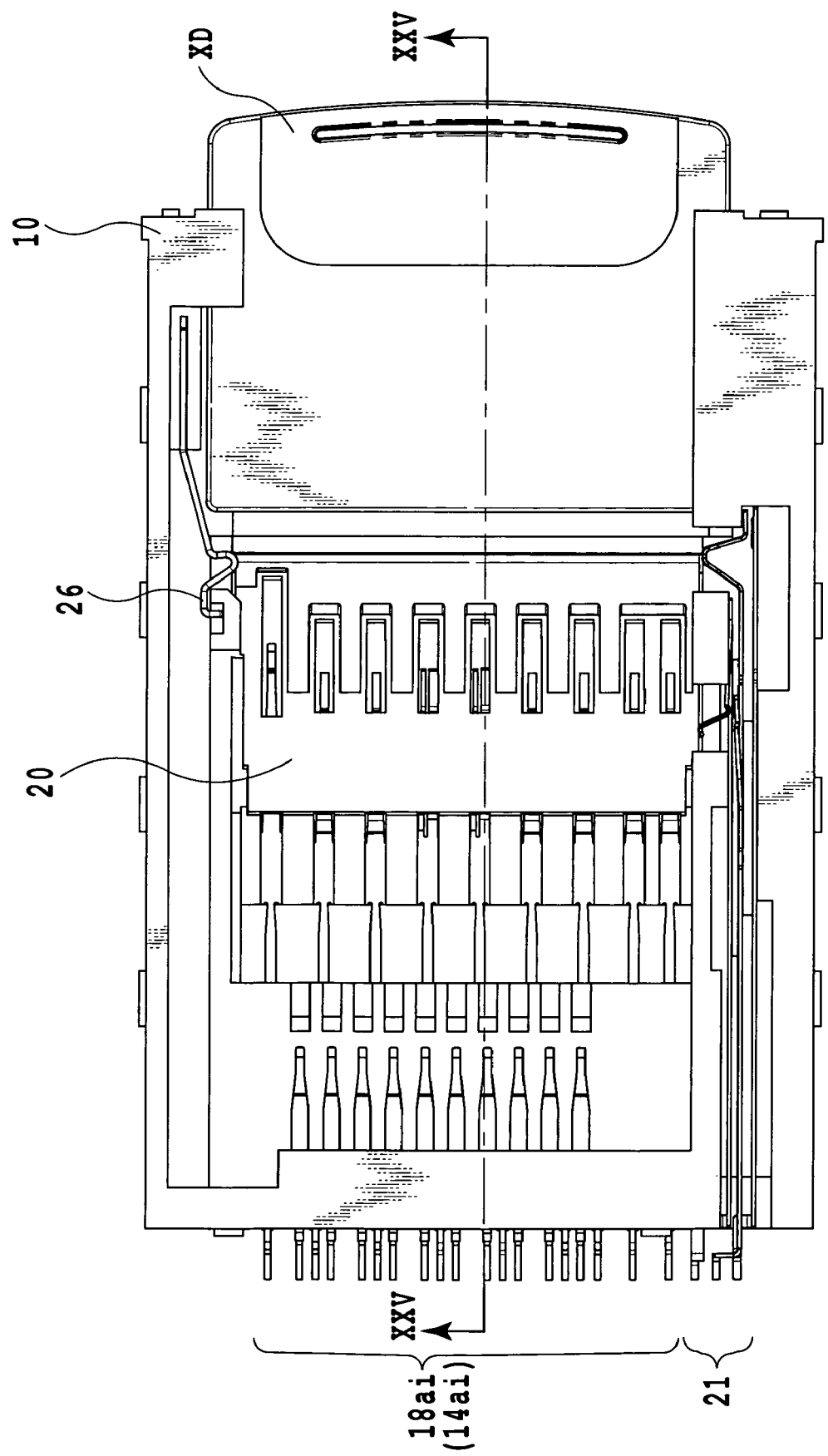
FIG. 23 is a plan view showing the IC card connector of an embodiment shown in FIG. 2, with an XD card mounted thereto.

The XD card XD (Ref. FIG. 23) is provided with a plurality of contact pads located on one of the surfaces so as to correspond to an array of contact terminals as described later, and a notch portion on one of the sides thereof. The XD card XD is slightly larger in width than that of the SD card SD. The XD card is considerably shorter and thinner than the entire length and thickness of the SD card SD.

The IC card connector includes a base member 10 on which a plurality of contact terminals is aligned, for electrical connection with the MEMORY STICK MS, the SD card SD, the MMC card and the XD card XD to be mounted to the IC card connector, and a cover member 12 that defines the card accommodation in cooperation with the base member 10.

Figure 4:
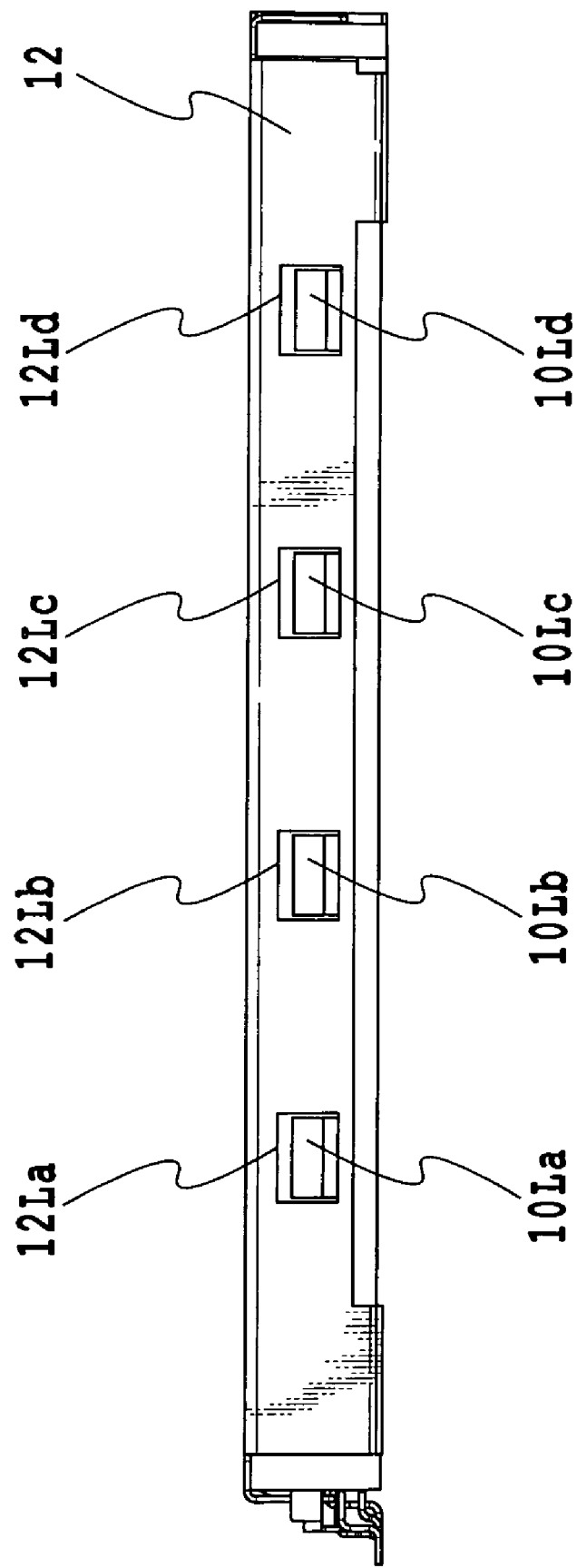
FIG. 4 is a side view of the IC card connector of an embodiment shown in FIG. 2.

The cover member 12, which has a portal cross-section, is made of a thin metal plate. The cover member 12 includes engaging holes 12La, 12Lb, 12Lc and 12Ld on one of the side faces, to be engaged with nibs on the base member 10 as described later, as shown in FIG. 4. Such engaging holes are also provided at the respective opposite positions on the other side face (not shown) of the cover member 12, to be engaged with nibs on the base member 10.

Accordingly, the engaging holes 12La, 12Lb, 12Lc and 12Ld and those on the opposite side of the cover member 12 are respectively engaged with the nibs of the base member 10, so that the cover member 12 is fixed to the base member 10.

Figure 1:
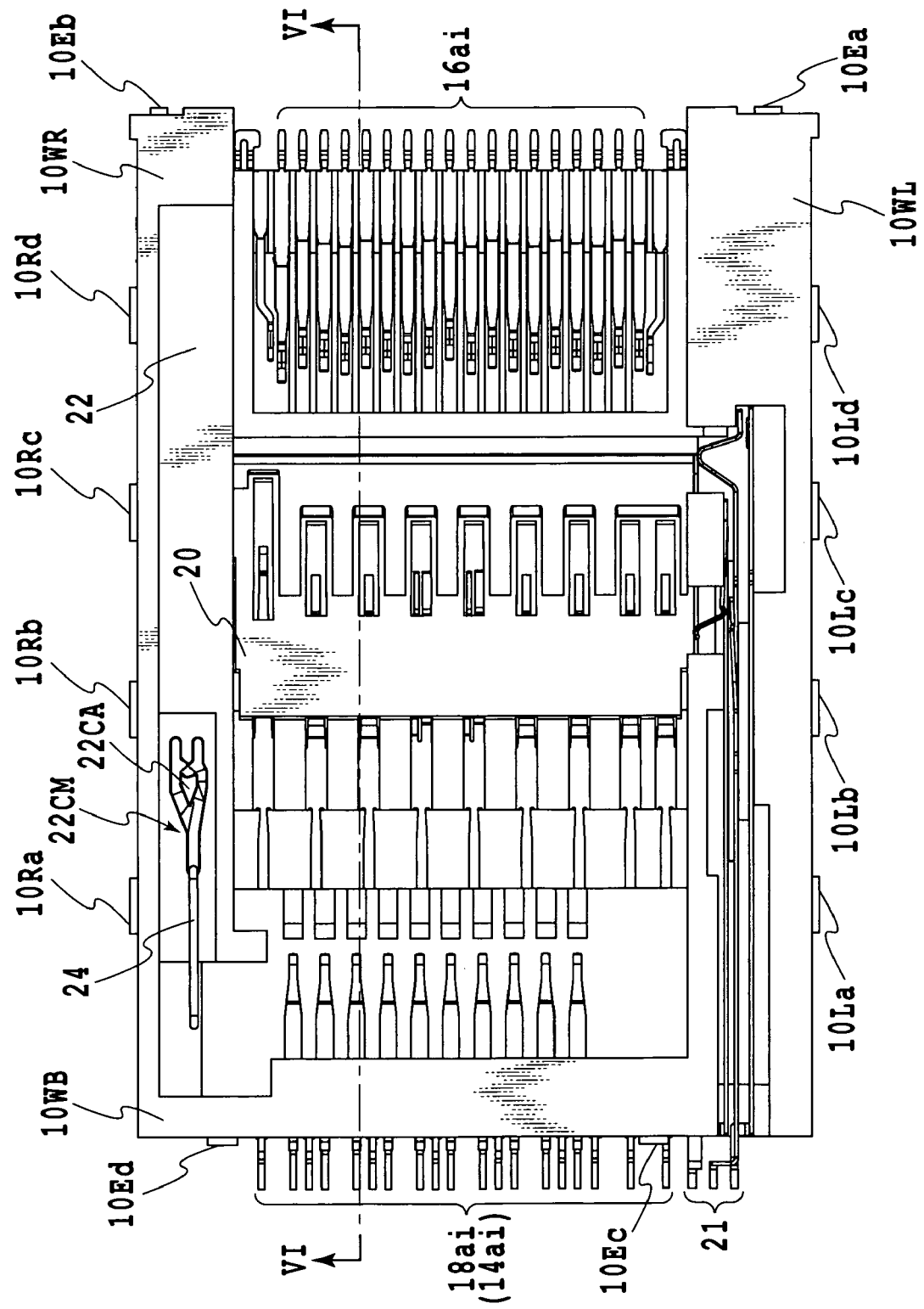
FIG. 1 is a plan view showing an important portion of an embodiment of an IC card connector according to the present invention.
Figure 5:
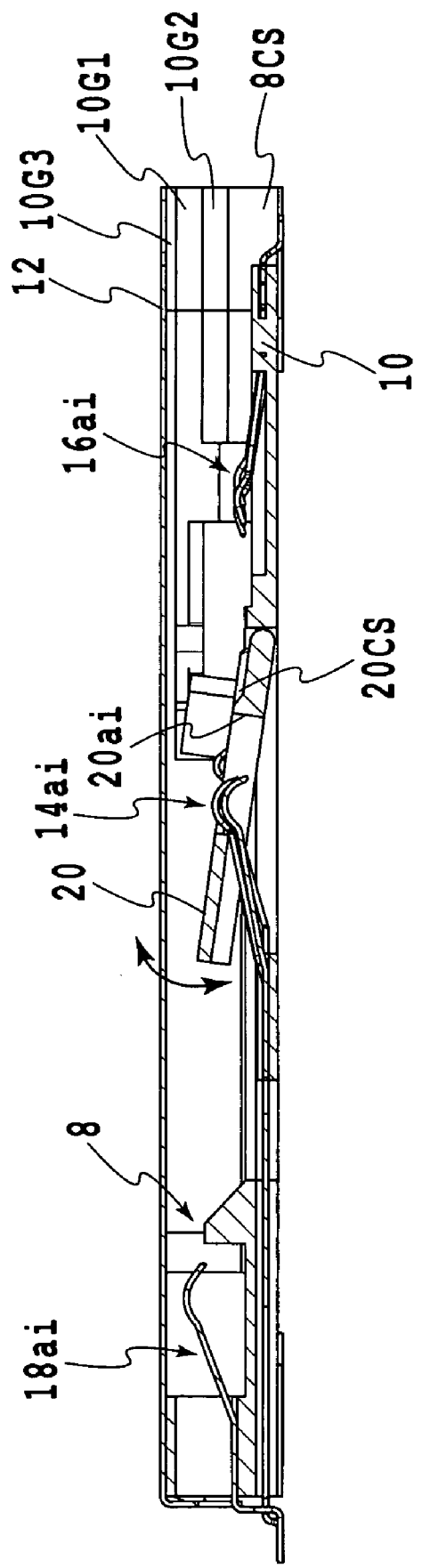
FIG. 5 is a cross-sectional view of the IC card connector of an embodiment shown in FIG. 2.

The card accommodation portion in the base member 10 is integrally formed of a molding resin, for example. The card accommodation portion is provided with an opening on an upper portion, part of a lower portion and an end portion opposite the contact terminal fixing portion as described later, as shown in FIGS. 1 and 5. Accordingly, by covering entire base member 10 with the cover member 12 as above, a card slot 8CS (Ref. FIG. 5) to be used in common for selectively inserting one of the MEMORY STICK MS, the SD card SD, the MMC card and the XD card XD is formed on an end portion of the card accommodation portion 8.

The card accommodation portion 8 serves as a multiple card accommodation including a first section formed closest to the card slot 8CS for accommodating the XD card XD, a second section disposed so as to partially overlap with the first section for accommodating the SD card SD or the MMC card, and a third section extended so as to partially overlap with the first and the second section, for accommodating the MEMORY STICK MS.

In other words, the first to the third sections are formed in a row along the loading/unloading direction of each cards, partially overlapping with one another. Accordingly, the common card slot 8CS defined in the first section is formed by the inner periphery surface of a pair of sidewalls 10WR and 10WL that include a pair of guide walls 10G3 for guiding the sides of the MEMORY STICK MS, the cover member 12 and the bottom portion of the base member 10, as shown in FIG. 3.

The first and the second section of the card accommodation portion is formed by the cover member 12, the sidewalls 10WR and 10WL forming the side portions, and a bottom portion that connects the sidewalls 10WR and 10WL. The third section of the card accommodation portion is formed by the cover member 12, the sidewalls 10WR and 10WL as above, the bottom portion, and the contact terminal fixing wall 10WB.

As shown in FIG. 1, the sidewalls 10WR and 10WL are provided with the nibs 10Ra, 10Rb, 10Rc, 10Rd, 10La, 10Lb, 10Lc, and 10Ld respectively, on the outer surface thereof. At an end portion of the sidewalls 10WR and 10WL, the nibs 10Eb, 10Ea are also formed respectively. On the outer surface of the contact terminal fixing wall 10WB, the nibs 10Ed, 10Ec are formed.

The contact terminal fixing wall 10WB forming the third section of the base member 10 is provided with a plurality of contact terminals 18*ai* (i=1 to 10) as shown in FIGS. 1 and 5. The contact terminals 18*ai* are aligned at a predetermined interval between one another, generally parallel to the sidewalls 10WR and 10WL.

The contact terminals 18*ai*, the third group of contact terminals, include elastic contact portion of an elastic material to be touched against the contact pad (electrode) of the MEMORY STICK MS for electrical connection, soldered terminal portions fixed to an electrode portion of a wiring board by soldering for electrical connection, and a fixing portion fixed to the base member 10 for mutually connecting the contact portions and the soldered terminal portions.

The fixing portion of the contact terminals 18*ai*, made of a thin metal plate such as phosphor bronze for a spring, is press-fitted into a groove formed on the bottom portion continued from the contact terminal fixing wall 10WB from a side opposite the side through which the MEMORY STICK MS is inserted, via a through hole formed on the contact terminal fixing wall 10WB, thus to be fixed to the base member 10.

The first section of the card accommodation portion is provided with a plurality of contact terminals 16*ai* (i=1 to 20).

The contact terminals 16*ai* are aligned at a predetermined interval between one another, generally parallel to the sidewalls 10WR and 10WL. The contact terminals 16*ai* are spaced from the contact terminals 18*ai* by a predetermined distance.

The contact terminals 16*ai*, a group of first contact terminals, include elastic contact portions to be touched against the contact pad (electrode) of the XD card XD for electrical connection, soldered terminal portions fixed to an electrode portion of a wiring board by soldering for electrical connection, and a fixing portion fixed to the base member 10 for mutually connecting the contact portions and the soldered terminal portions.

The fixing portion of the contact terminals 16*ai*, made of a thin metal plate such as phosphor bronze for a spring, for example, is press-fitted into a groove formed on the bottom portion of the base member 10 from the side through which the XD card XD is inserted, thus to be fixed to the base member 10. The soldered terminal portions of the contact terminals 16*ai* are projected from an end portion of the bottom portion toward the card slot 8CS. The height of the contact portions from the bottom portion is slightly lower than grooves 10G1 and 10G2 formed below the guide wall 10G3 in the sidewalls 10WR and 10WL. This causes the contact portions of the contact terminals 16*ai* to be not capable of being hit and damaged by the front edge of the MEMORY STICK MS, SD card SD or the MMC card guided by the grooves 10G1 and 10G2, when mounting those cards accommodated in the second or the third section.

The second section of the multiple card accommodation is provided with a plurality of contact terminals 14*ai* (i=1 to 9), aligned along width direction and generally parallel to one another. The contact terminals 14*ai* are provided at a middle position between the contact terminals 18*ai* and the contact terminals 16*ai*. At a position below the contact portions of the contact terminals 14*ai*, an opening is formed on a bottom portion of the base member 10 so as to cause the contact portions to pass therethrough.

The contact terminals 14*ai*, a group of second contact terminals, include the elastically deformable contact portions to be touched against the contact pad (electrode) of the SD card SD or the MMC card for electrical connection, soldered terminal portions fixed to an electrode portion of a wiring board by soldering for electrical connection, and a fixing portion fixed to the base member 10 for interconnecting the contact portions and the soldered terminal portions. The fixing portion of the contact terminals l4*ai*, made of a thin metal plate such as phosphor bronze for a spring for example, is press-fitted into a groove formed on the bottom portion of the base member 10 from the side through which the SD card SD is inserted, thus to be fixed to the base member 10. The soldered terminal portions are projected outward beyond the contact terminal fixing wall 10WB, so as to be aligned with the soldered terminal portions of the contact terminals 18*ai* in a line. The tip portions of the contact portions are projected into the path throughwhich the MEMORY STICK MS and the SD card SD pass, when one of these cards is not inserted, as shown in FIG. 5.

In addition, with a middle portion of the contact portion of each contact terminal 14*ai*, a periphery of slits 20*ai* (i=1 to 9) of a contact pressing plate 20 as described later is engaged.

Figure 8:
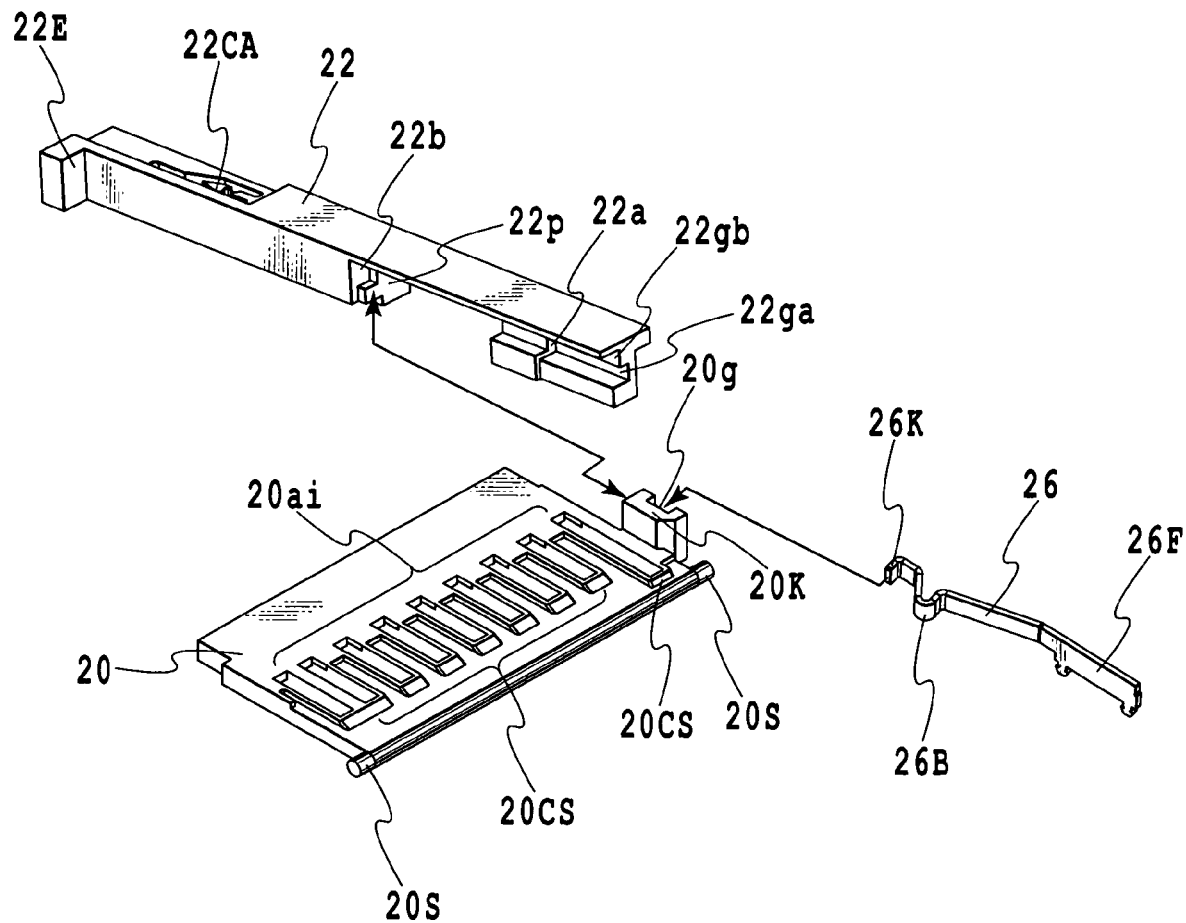
FIG. 8 is an exploded perspective view showing a structure of an ejector, the contact pressing plate and the locking/unlocking hardware employed in the IC card connector of an embodiment shown in FIG. 2.

Referring to FIG. 8, the contact pressing plate 20 is provided with a supporting shaft 20S at the respective end portions of both sides. The supporting shafts 20S are slidably and rotational movably engaged with a guide groove (not shown) provided on each of the opposing inner surfaces of the sidewalls 10WR and 10WL. Thus, according to FIG. 5, the contact pressing plate 20 is rotational movably supported in a counterclockwise direction for pressing the contact portions of the contact terminals 14*ai* toward the lower opening, as well as in a clockwise direction for releasing the contact portions of the contact terminals 14*ai*, while making a sliding motion.

The contact pressing plate 20 has the slits 20*ai* (i=1 to 9) aligned along a width direction so as to correspond to the contact portions of the contact terminals 14*ai*. Into each slit 20*ai*, as shown in FIG. 5, the tip portion of each contact portion of the contact terminals 14*ai* is inserted from below, so as to intersect with the contact pressing plate 20. Accordingly, the contact pressing plate 20 is supported by the contact terminals 14*ai* in a posture inclined by a predetermined angle so that an end portion thereof intrudes into the path that the SD card SD and so on pass through, as shown in FIG. 5.

Figure 6:
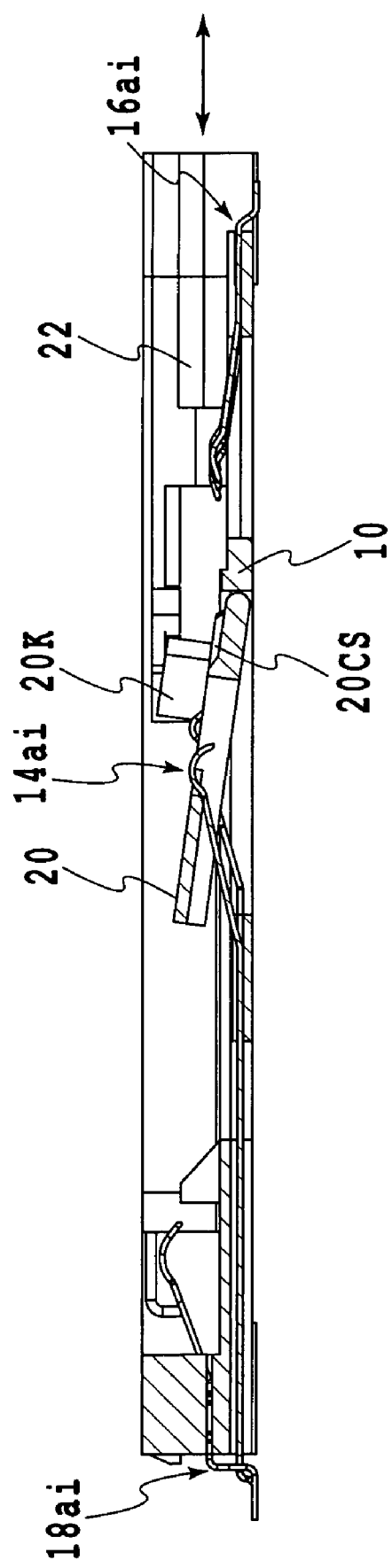
FIG. 6 is a cross-sectional view taken along the line VI-VI of FIG. 1.
Figure 7:
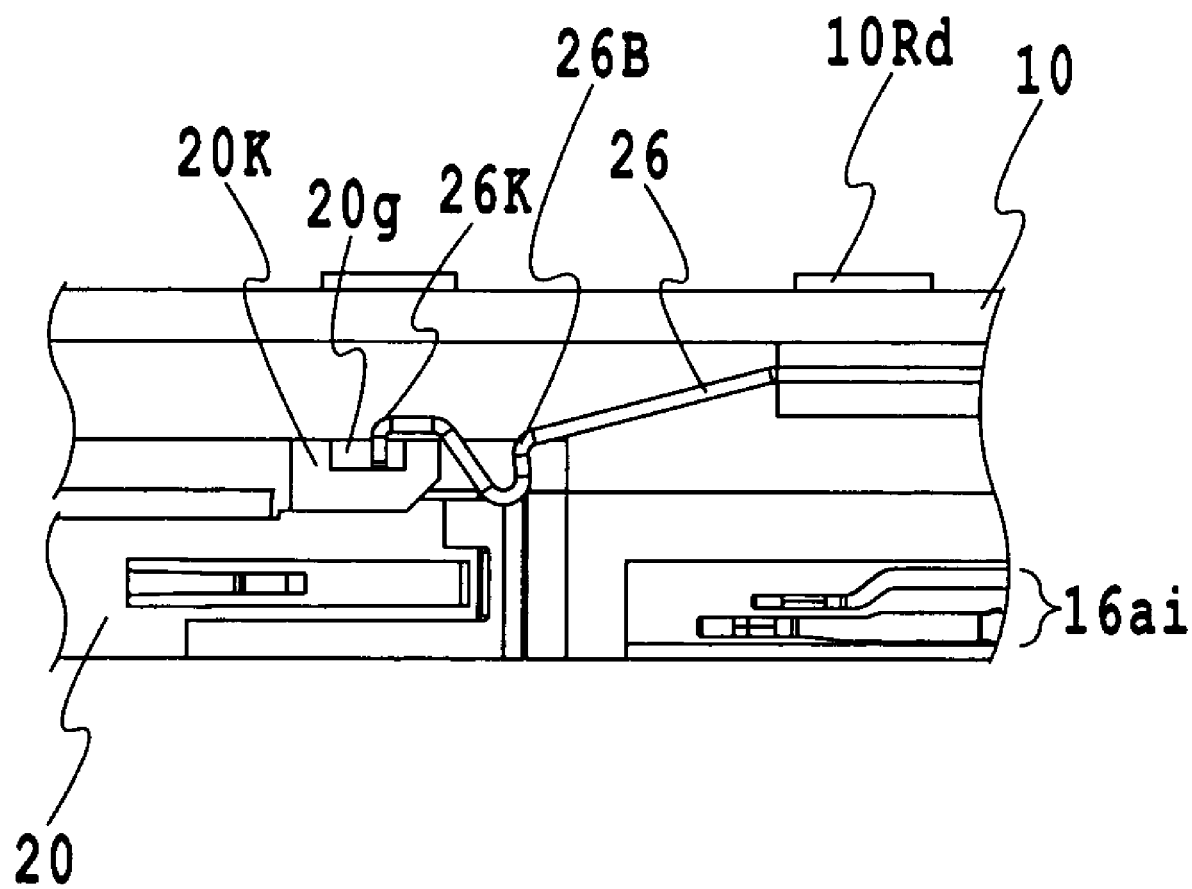
FIG. 7 is an enlarged partial block diagram showing a structure of a contact pressing plate and a locking/unlocking hardware employed in the IC card connector of an embodiment shown in FIG. 2.

Around the respective slits 20*ai*, guide walls 20CS are formed for guiding the SD card SD, as shown in FIG. 8. The guide walls 20CS are respectively engaged with a plurality of grooves formed on the SD card SD. Between the adjacent guide walls 20CS, a gap is formed. Such gaps are movably engaged with partition walls of the inserted SD card SD. Referring to FIG. 7, a spring catcher 20K formed integrally with on one of the side portions of the contact pressing plate 20, the spring catcher including a recess 20*g* with which an end portion of a locking/unlocking hardware 26 is selectively engaged. The recess 20*g* passes through along thickness direction of the contact pressing plate 20. Namely, when the end portion of the locking/unlocking hardware 26 is engaged with the periphery of the recess 20*g*, the contact pressing plate 20 is retained under a locked state, as shown in FIGS. 5 and 6. Note that a surface of the spring catcher 20K opposing the ejector 22 as described later is touched against a projecting piece 22P of the ejector 22.

Referring back to FIG. 1, the sidewall 10WL is provided with a detecting contact unit 21 that detects the write-protect button of the SD card SD as above.

Inside the sidewall 10WR, an ejecting mechanism is provided. The ejecting mechanism serves to retain the XD card XD, the SD card SD, the MMC card, or the MEMORY STICK MS in the first section of the card accommodation portion 8, the second section and the third section thereof respectively, and to selectively eject each cards out of the card accommodation portion 8.

As shown in FIGS. 1 and 8, the ejecting mechanism comprises an ejector 22 which is supported so as to relatively move with respect to the base member 10 according to loading/unloading operation of each card, allowing the ejector 22 to selectively retain one of those IC cards; a coil spring (not shown) interposed between the inner periphery of the base member 10 and an end portion of the ejector 22, for biasing the ejector 22 toward the discharging direction of the SD card SD and so on; and an ejector controller portion to be used in common for the IC cards, for selectively controlling the holding or release of the ejector 22 with respect to the base member 10, according to the loading/unloading operation of the SD card SD and so on.

The ejector 22 is made of a resin material, for example, and supported by the inner periphery of the sidewall 10WR, slidably on the base member 10 along loading/unloading direction of the SD card SD and so on.

Also as shown in FIG. 8, the ejector 22 includes a touching surface 22E on an end portion thereof, with which a part of the tip portion of the inserted MEMORY STICK MS is engaged. The ejector 22 also has on the other end portion a groove 22*ga* for guiding the XD card XD, and groove 22*gb* for guiding the SD card SD. A step portion 22*a* is formed on one of the sides of groove 22ga, the step portion for engagement with a part of the tip portion of the XD card XD. Between the touching surface 22E and the step portion 22a, a projecting piece 22P is provided to be touched against the outer periphery of the spring catcher 20K as above. Adjacent to the projecting piece 22P, a touching surface 22b is formed for engagement with a part of the tip portion of the SD card SD. Accordingly, the ejector 22 is made to move toward the contact terminal fixing wall 10WB, when one of the MEMORY STICK MS, the XD card XD and the SD card SD is inserted with a part of the tip portion thereof touched against the touching surface 22E, the step portion 22a, and the touching surface 22b respectively.

Figure 9:
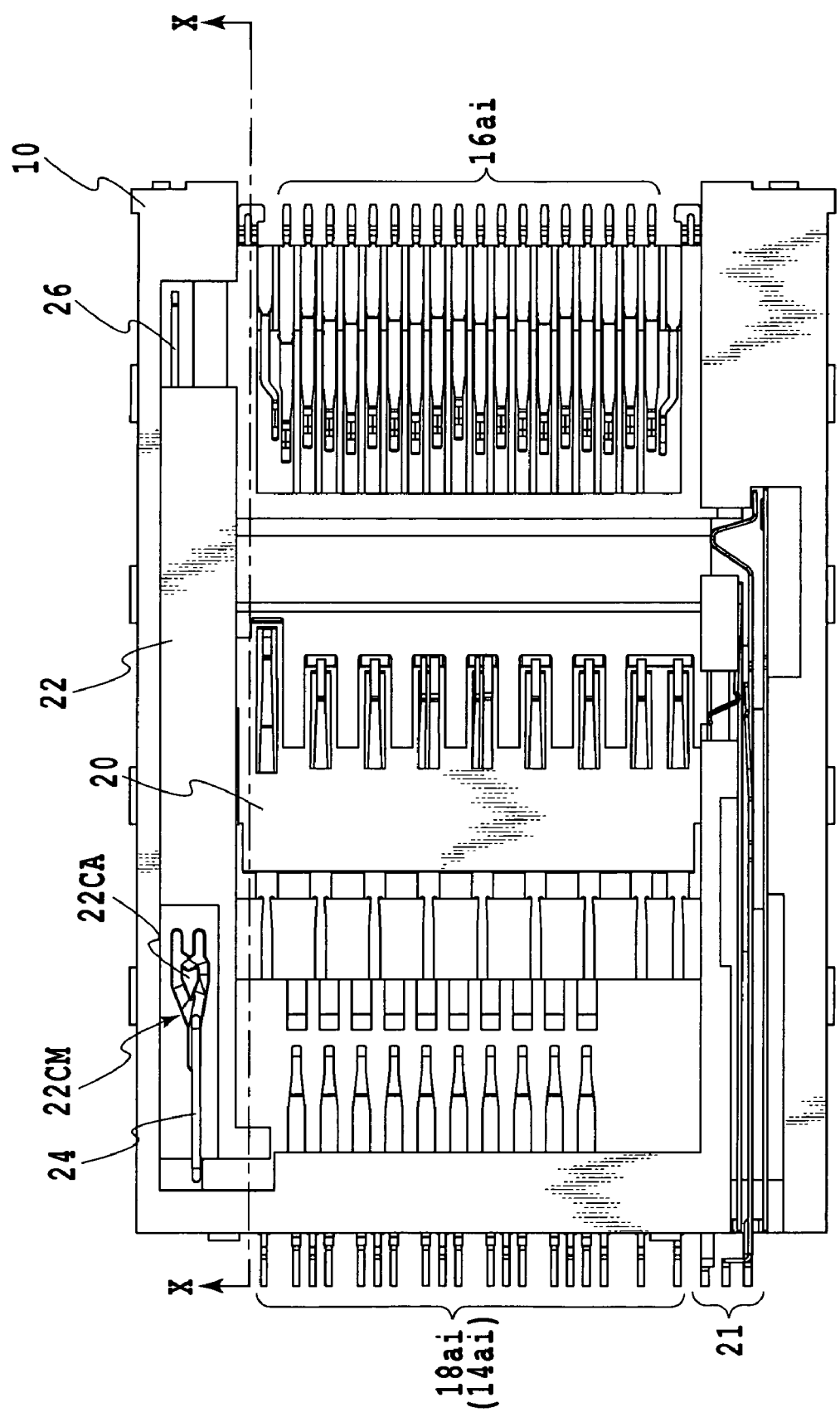
FIG. 9 is a plan view made available for explaining an operation of the IC card connector of an embodiment shown in FIG. 2.
Figure 10:
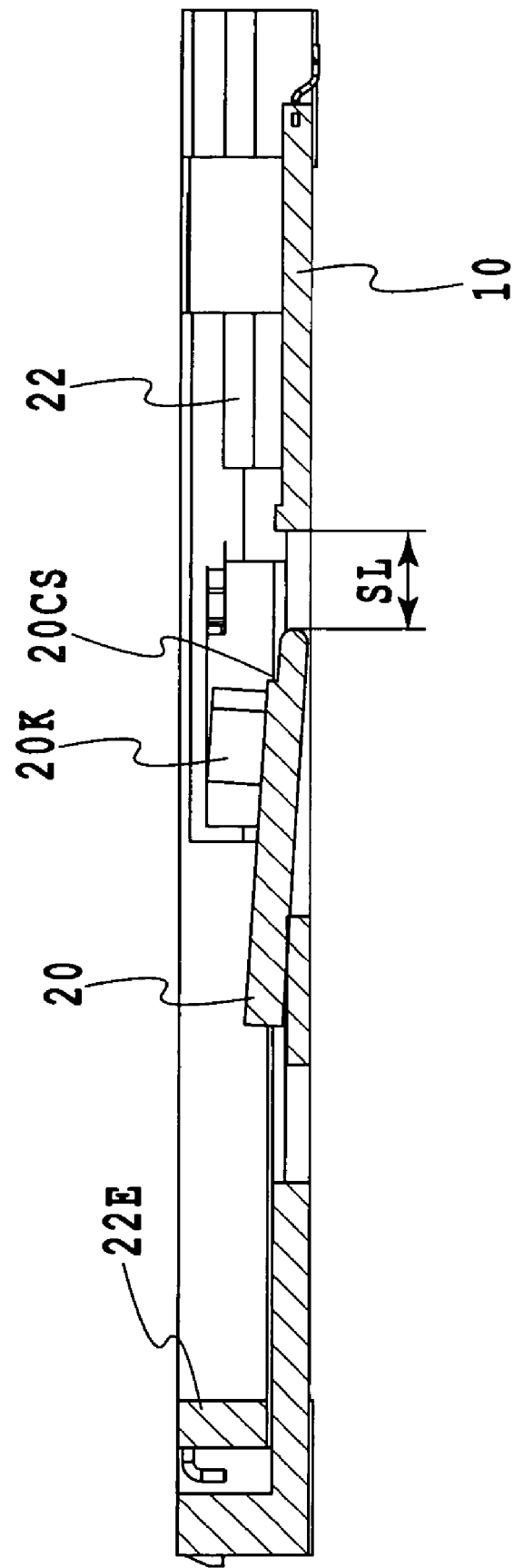
FIG. 10 is a cross-sectional view taken along the line X-X of FIG. 9.

The ejector controller portion includes, as shown in FIGS. 8 and 9, a generally heart-shaped cam (heart cam) 22CA integrally formed on the upper surface of the ejector 22 opposing the cover member 12, a lever guide groove 22CM constituted of a plurality of step portions formed around the heart cam 22CA, a generally reverse channel-shaped cam lever 24 with a first end portion connected to a hole on the sidewall 10WR and a second end portion disposed so as to slide along the lever guide groove 22CM, and a pressing spring (not shown) of the cover member 12.

The pressing spring serves to bias the cam lever 24 so that the bent tip portion thereof slides on the guiding surface in the lever guide groove 22CM.

The heart cam 22CA, made of a resin, includes a generally V-shaped cam surface to be selectively engaged with the second end portion of the cam lever 24.

The lever guide groove 22CM includes a first guide groove formed close to one of the sides of the heart cam 22CA so as to linearly extend along the sidewall 10WR, a second guide groove obliquely extending along the other side of the heart cam 22CA toward the sidewall 10WR so as to branch from the first guide groove, and then extending in parallel to the first guide groove, and a third guide groove that connects a portion between an end portion of the first guide groove and an end portion of the second guide groove and opposing the cam surface.

Accordingly, when the second end portion of the cam lever follows up the motion of the ejector 22 so as to be guided sequentially along the first guide groove, the third guide groove and the second guide groove, the ejector 22 is sequentially caused to inwardly advance, to be retained and to be discharged accompanied with the IC card.

Figure 18:
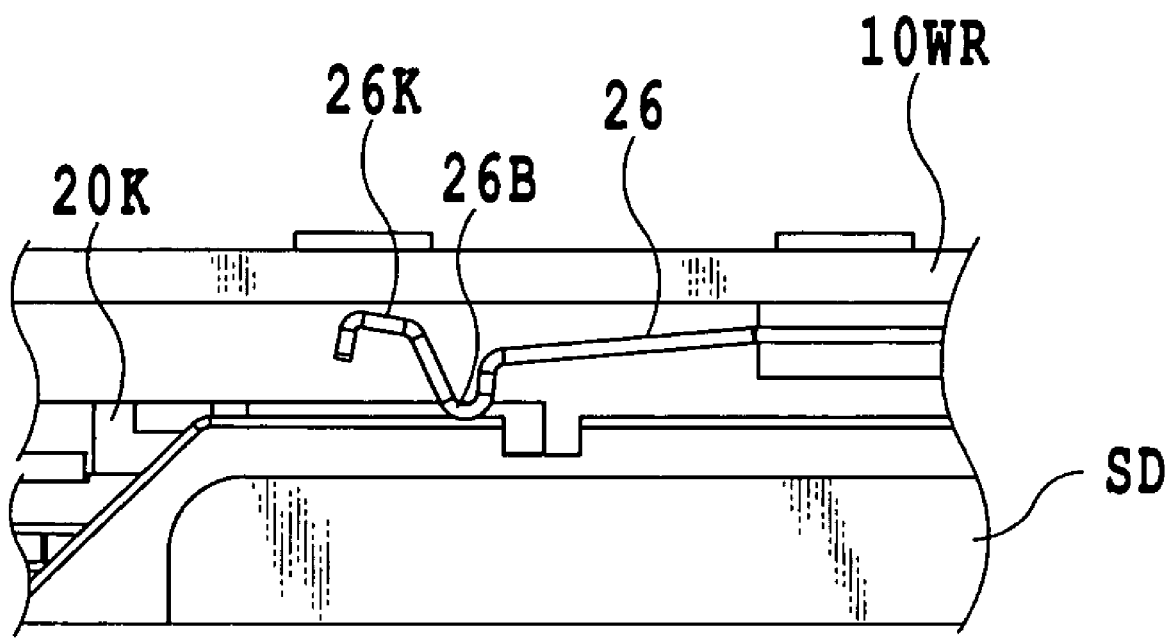
FIG. 18 is an enlarged partial plan view showing a structure of the contact pressing plate and the locking/unlocking hardware under the state shown in FIG. 16.

Below the ejector 22, the locking/unlocking hardware 26 is provided. The locking/unlocking hardware 26 includes a fixed portion 26F fixed to the sidewall 10WR at an end portion, and a bent portion 26K selectively engaged with the periphery of the recess 20g of the spring catcher 20K as above at the other end portion which is elastically deformable, and a curved portion 26B connecting the fixed portion 26F and the bent portion 26K. As shown in FIG. 7, the bent portion 26K of the locking/unlocking hardware 26 is engaged with the periphery of the recess 20g of the contact pressing plate 20 (locked state) when none of the IC cards are inserted, and disengaged from the periphery of the recess 20g (unlocked state) as shown in FIG. 18, once the SD card SD or another is inserted.

Figure 11:
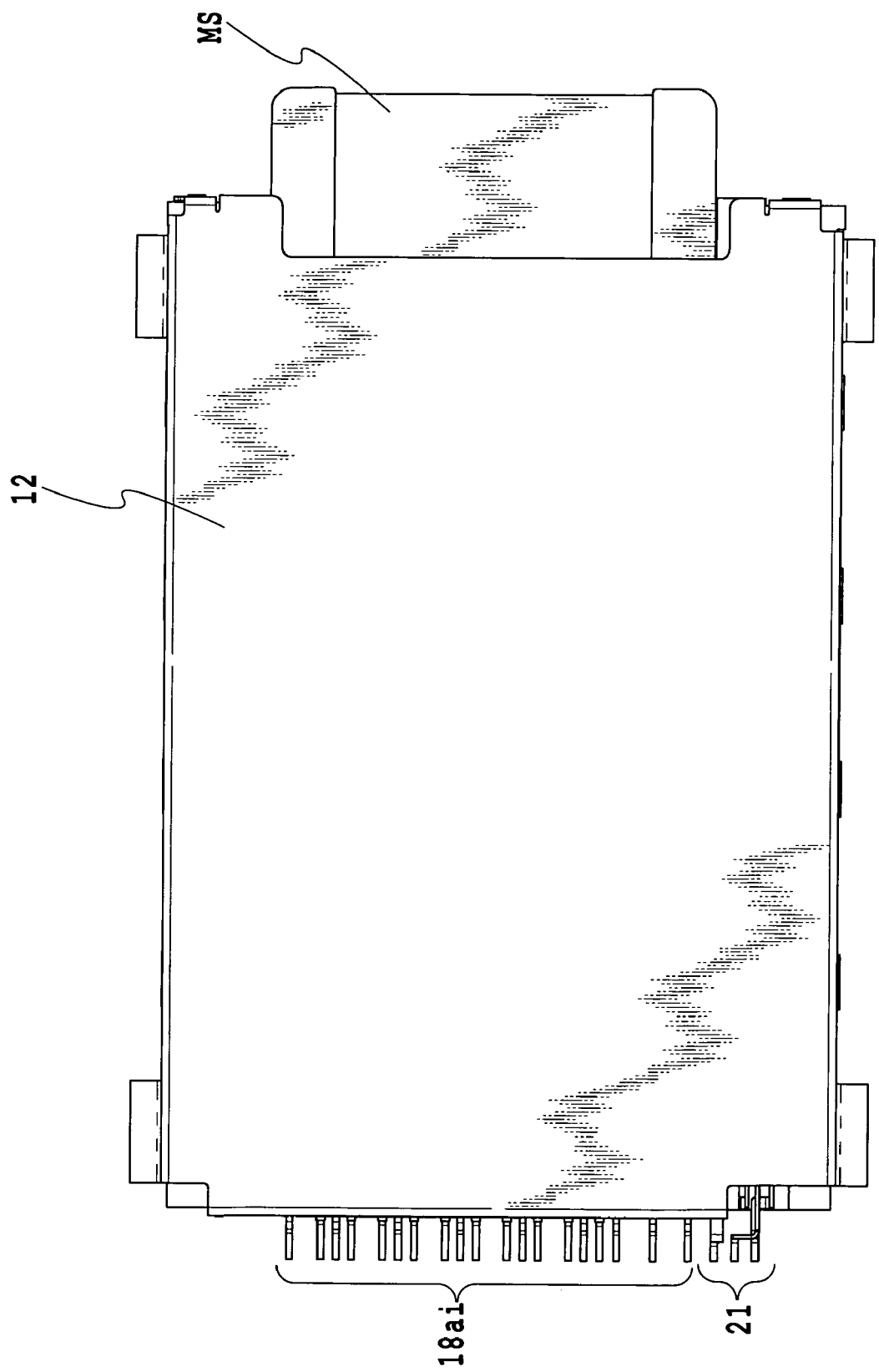
FIG. 11 is a plan view showing the IC card connector of an embodiment shown in FIG. 2 with a MEMORY STICK mounted thereto.
Figure 12:
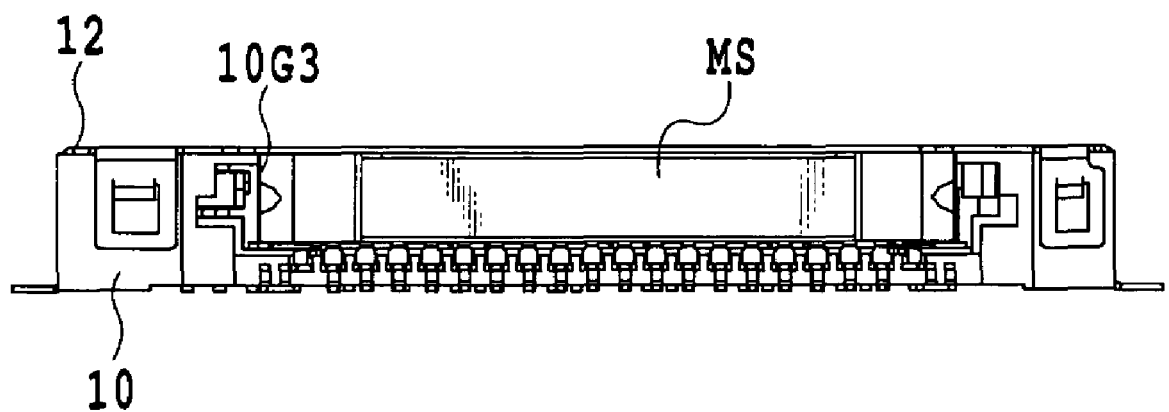
FIG. 12 is a front view of the state of FIG. 11, seen from the side with the card slot.
Figure 15:
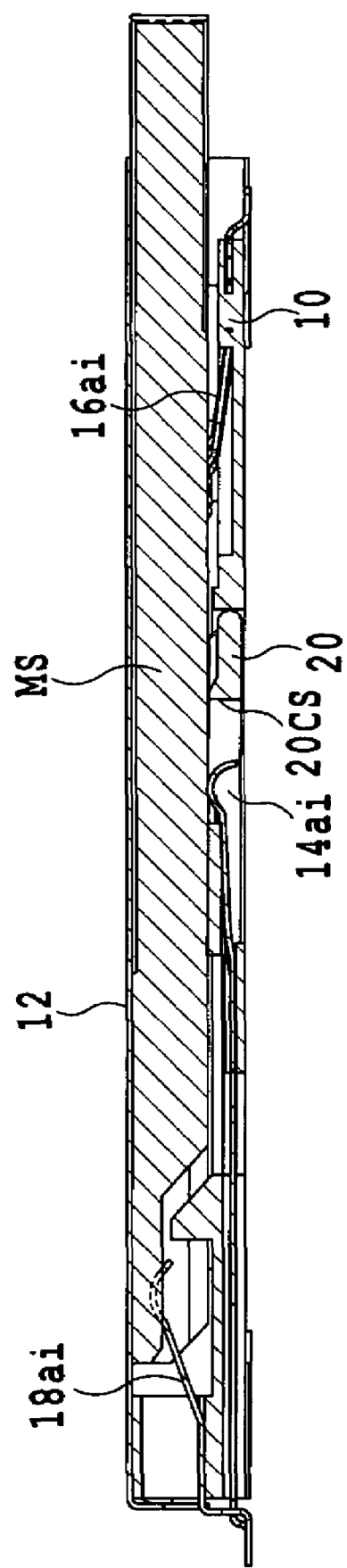
FIG. 15 is another cross-sectional view made available for explaining an operation of the IC card connector of an embodiment shown in FIG. 2 with the MEMORY STICK mounted thereto.

Under such a configuration, when inserting the MEMORY STICK MS, as shown in FIGS. 11 and 12, first, the tip portion of the MEMORY STICK MS is guided along the guide wall 10G3 after passing through the card slot 8CS, thus to pass through the first section, and touched against the surface of the contact pressing plate 20. Next when the tip portion of the MEMORY STICK MS is further pressed in the insertion direction while being touched against the surface of the contact pressing plate 20 (Ref. FIG. 14), the periphery of the recess 20g keeps engaged with the bent portion 26K of the locking/unlocking hardware 26 so as to retain the contact pressing plate 20 in its initial position, and the contact pressing plate 20 is rotated and detruded against the elastic force of the contact terminals 14ai, as shown in FIG. 15. This causes the tip portion of the contact portions of the contact terminals 14ai to pass through the slits 20ai and to penetrate the opening of the base member without interfering with the MEMORY STICK MS.

Thereafter, the tip portion of the MEMORY STICK MS is touched the touching surface 22E of the ejector 22 against the biasing force of the coil spring (not shown) and pressed in the insertion direction together with the ejector 22, upon passing through the second section over the contact pressing plate 20 and entering the third section. After that, when such pressing force is released, the end portion of the cam lever 24 is separated from the first guide groove to be engaged with the cam surface of the third guide groove. In other words, the ejector controller portion keeps the ejector 22 in the retaining state. Therefore, the contact pad of the retained MEMORY STICK MS held is electrically connected with the contact portions of the contact terminals 18ai.

Figure 13:
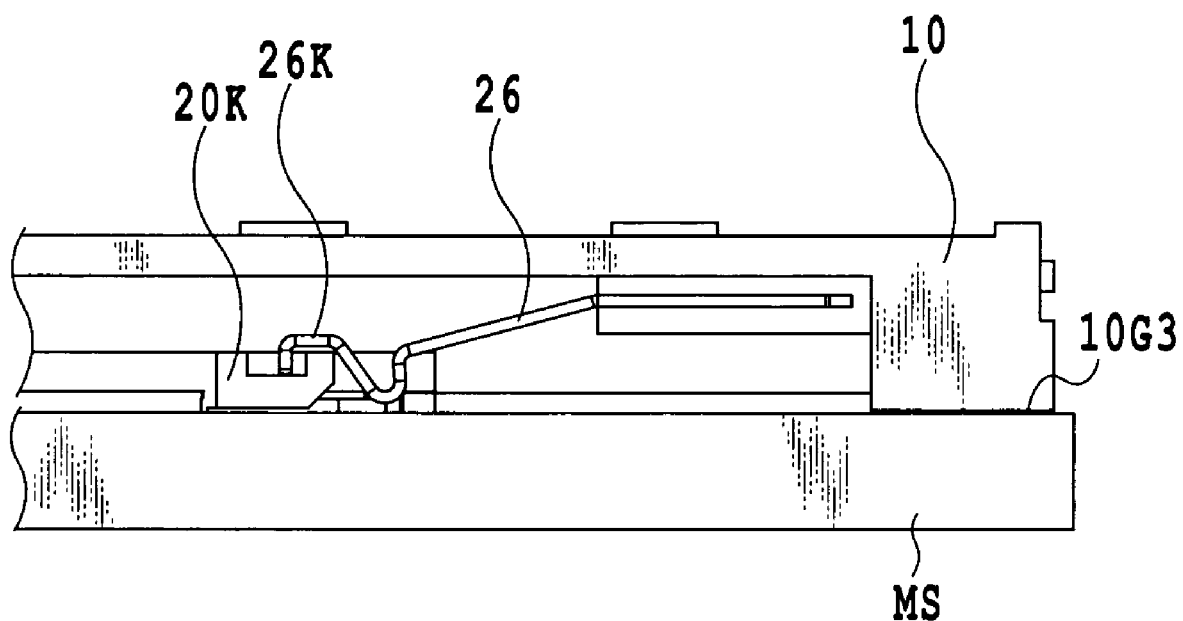
FIG. 13 is an enlarged partial block diagram showing a structure of the contact pressing plate and the locking/unlocking hardware under the state shown in FIG. 11.

When removing the MEMORY STICK MS, the MEMORY STICK MS is once pressed slightly further forward. At that time, advancing of the ejector 22 causes one end portion of the cam lever 24 to release and separate from the cam surface, and lead it to the second guide groove. Thus, the ejector 22 is pressed backward by the biasing force of the coil spring (not shown). At this time, when the tip portion of the MEMORY STICK MS is pressed backward with the ejector 22 over the contact pressing plate 20 to a position close to the card slot 8CS, the end portion of the contact pressing plate 20 automatically rotates upward about the supporting shafts 20S as shown in FIG. 14, by the restoring force of the contact portions of the contact terminals 14ai. Because of this rotation, the rim of the recess 20g is rotated toward the locking/unlocking hardware 26 to be forcibly engaged with the bent portion 26K of the locking/unlocking hardware 26, thus resulting in the locked state as shown in FIG. 13.

Then, upon pulling further outward the end portion of the MEMORY STICK MS exposed outside the IC card connector, the MEMORY STICK MS is removed.

Figure 19:
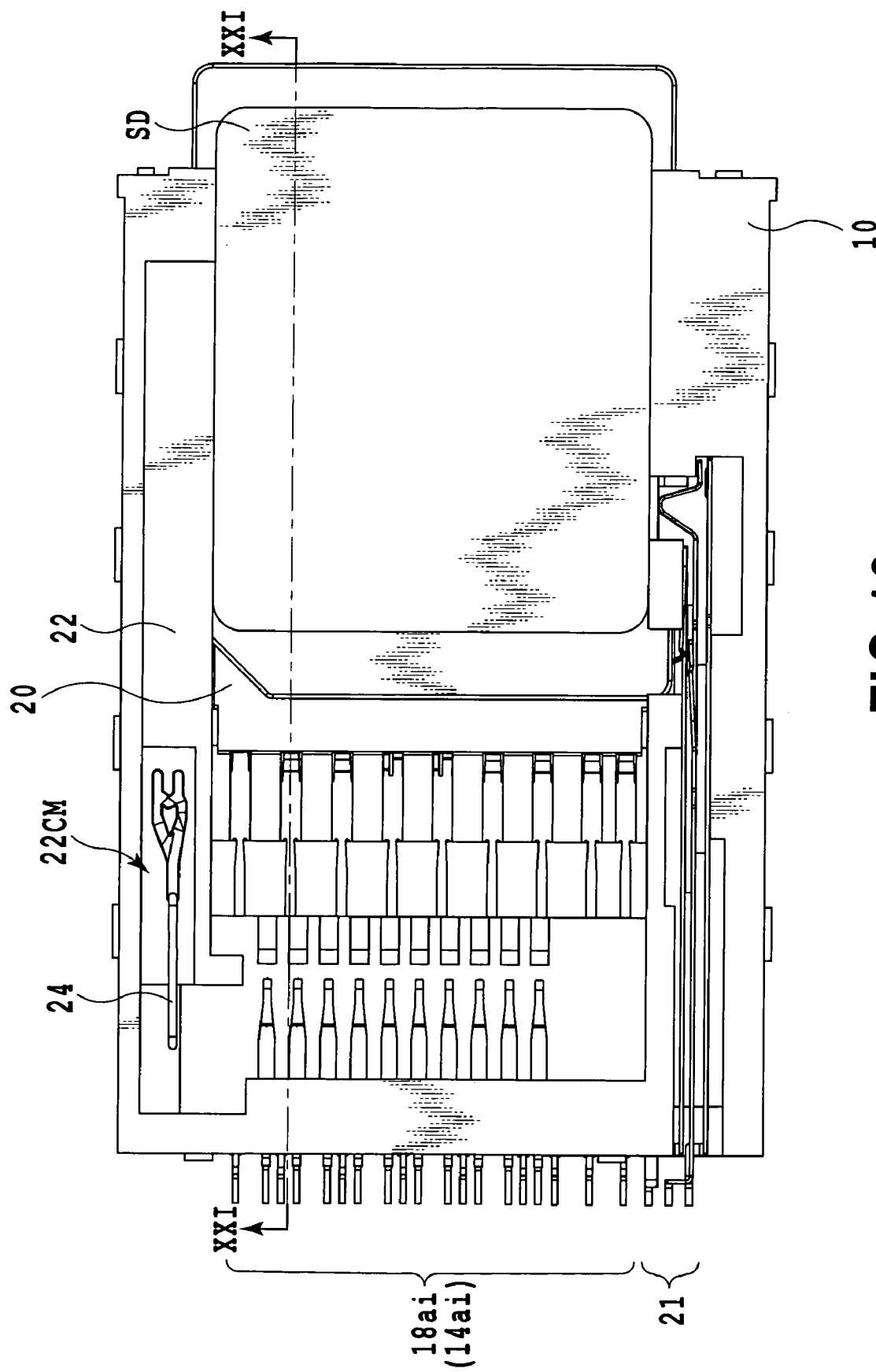
FIG. 19 is a plan view made available for explaining an operation of the IC card connector of an embodiment in FIG. 2 with the SD card mounted thereto.
Figure 20:
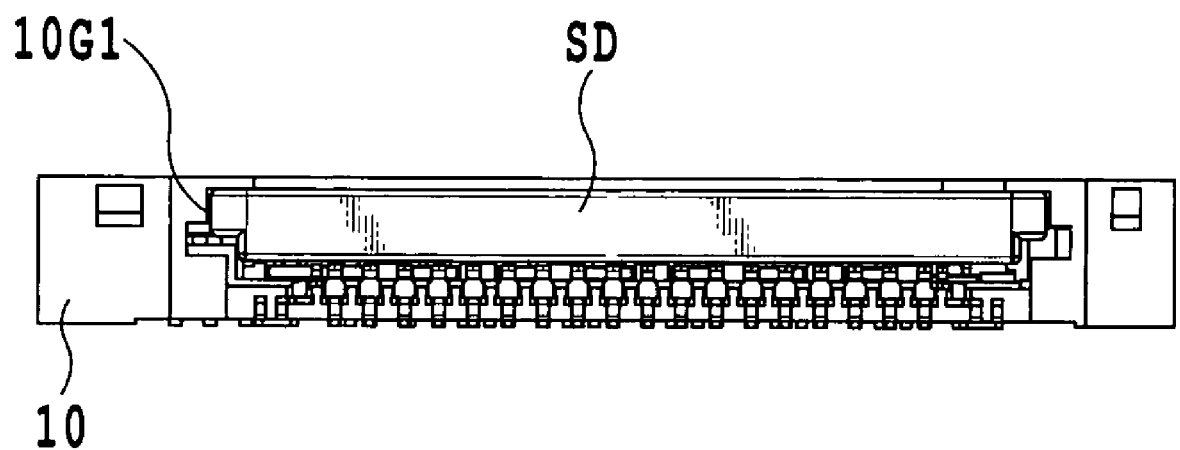
FIG. 20 is a front view of the IC card connector under the state shown in FIG. 19, seen from the side with the card slot.
Figure 21:
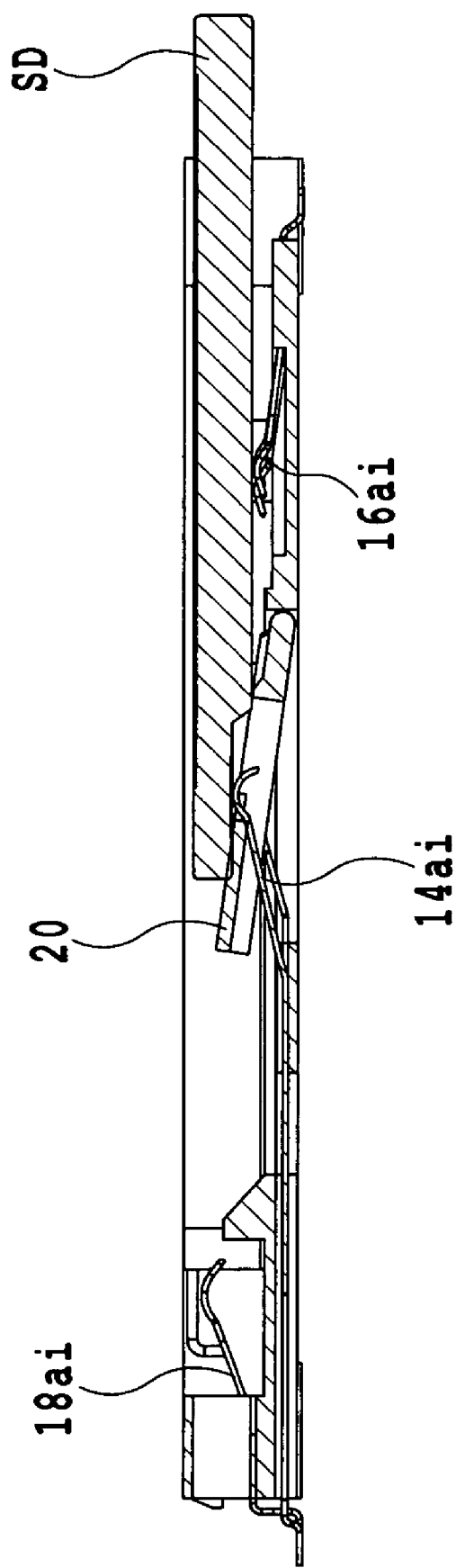
FIG. 21 is a cross-sectional view taken along the line XXI-XXI of FIG. 19.

When mounting the SD card SD or the MMC card, the front edge of the SD card SD is guided along the groove 10G1 upon passing through the card slot 8CS as above to be inserted in the second section of the card accommodation portion through the first section, as shown in FIGS. 19 and 20.

Figure 22:
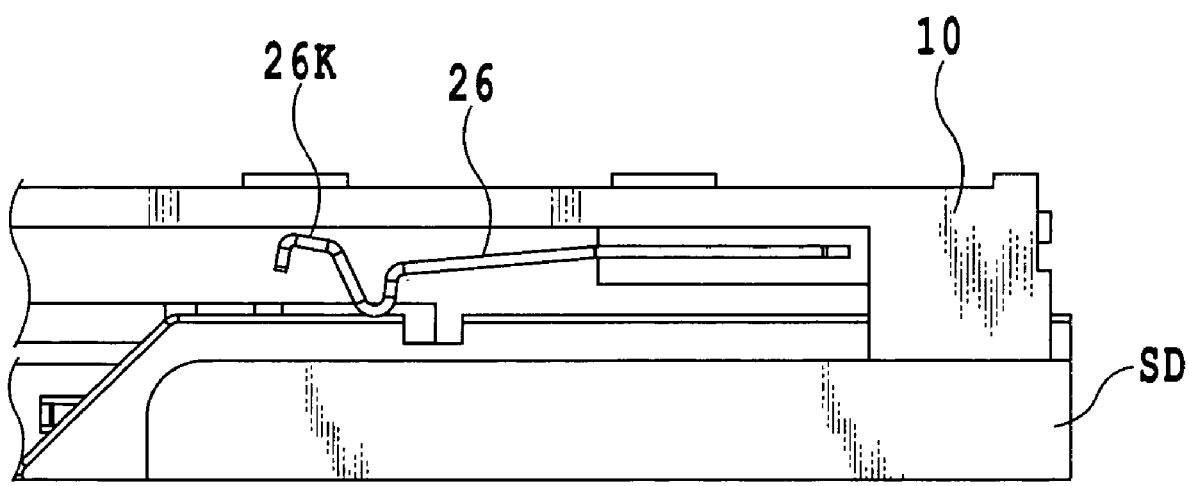
FIG. 22 is an enlarged partial plan view showing a structure of the contact pressing plate and the locking/unlocking hardware under the state shown in FIG. 19.

At that time, one of the side faces of the SD card SD presses the curved portion 26B of the locking/unlocking hardware 26 in the width direction toward the sidewall 10WR as shown in FIG. 22. This causes the bent portion 26K of the locking/unlocking hardware 26 to be separated and disengaged from the rim of the recess 20g, resulting in unlocking the contact pressing plate 20. Additionally, the front edge of the SD card SD presses the contact pressing plate 20 such that the front edge of the SD card SD is touched to press down the contact portions of the contact terminals 14ai.

Figure 17:
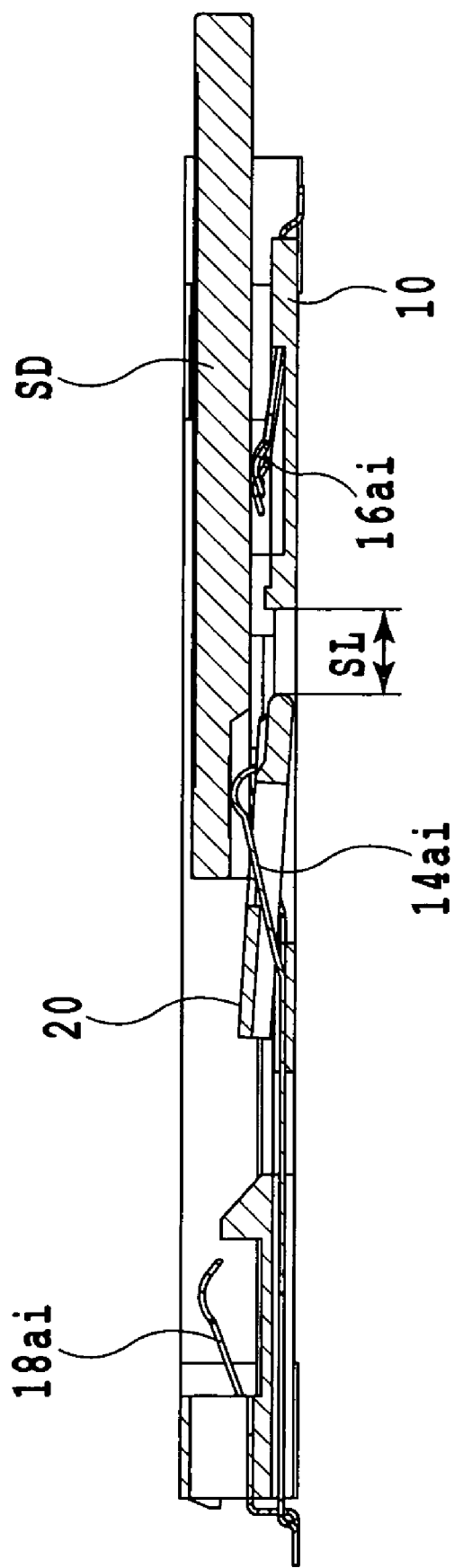
FIG. 17 is a cross-sectional view taken along the line XVII-XVII of FIG. 16.

Accordingly, the end portion of the contact pressing plate 20 is rotated about the supporting shafts 20S and detruded without interfering with the tip portion of the contact portions of the contact terminals 14ai, as shown in FIGS. 19 and 20, as well as being slid by a predetermined distance SL as shown in FIGS. 16, 17 and 18. At that time, the end portion of the cam lever 24 is separated from the first guide groove, thus to be engaged with the cam surface of the third guide groove when the pressing force is removed after the front edge of the SD card SD is maintained touched against the touching surface 22*b* of the ejector 22 and further pressed together with the ejector 22 against the biasing force of the coil spring (not shown). Thus, the ejector controller portion keeps the ejector 22 in the retaining state.

Accordingly, the SD card SD is retained in the second section of the card accommodation portion, and also the contact pad of the SD card SD and the contact portions of the contact terminals 14*ai* are made to touch via the slits 20*ai* of the contact pressing plate 20 so as to be electrically connected.

When removing the SD card SD, the mounted SD card SD is once pressed slightly further forward. Advancing of the ejector 22 causes one end portion of the cam lever 24 to be released and separated from the cam surface and to be led to the second guide groove. Thus, the ejector 22 is pressed backward together with the contact pressing plate 20 and the SD card SD via the projecting piece 20, by the predetermined distance SL by the biasing force of the coil spring.

Then, the end portion of the contact pressing plate 20 automatically rotates upward about the supporting shafts 20S by the restoring force of the contact terminals 14*ai*. At that time, the rim of the recess 20*g* is rotated toward the locking/unlocking hardware 26 to be forcibly engaged with the bent portion 26K of the locking/unlocking hardware 26 which is now back to its initial position, thus resulting in the locked state.

Then, upon pulling further outward the end portion of the SD card SD exposed outside the IC card connector, the SD card SD is removed.

Figure 24:
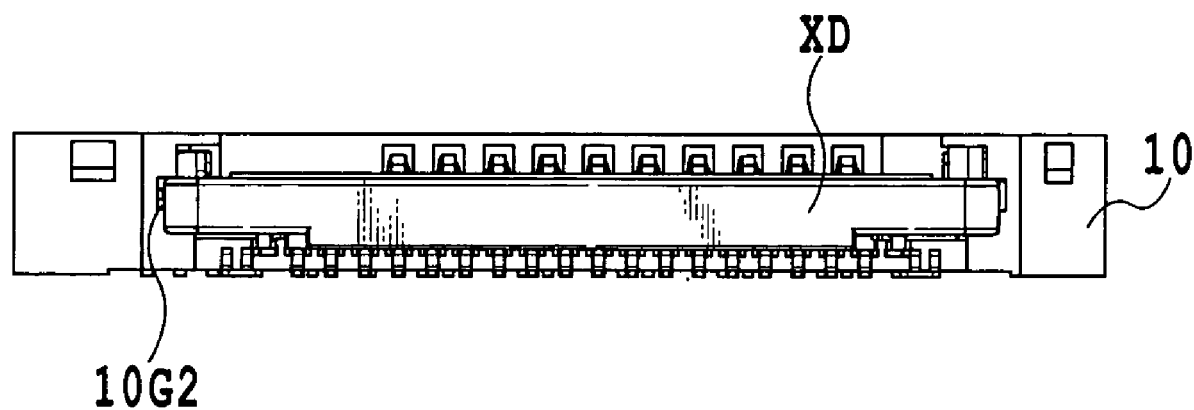
FIG. 24 is a front view showing the IC card connector of an embodiment shown in FIG. 23, seen from the side with the card slot.
Figure 25:
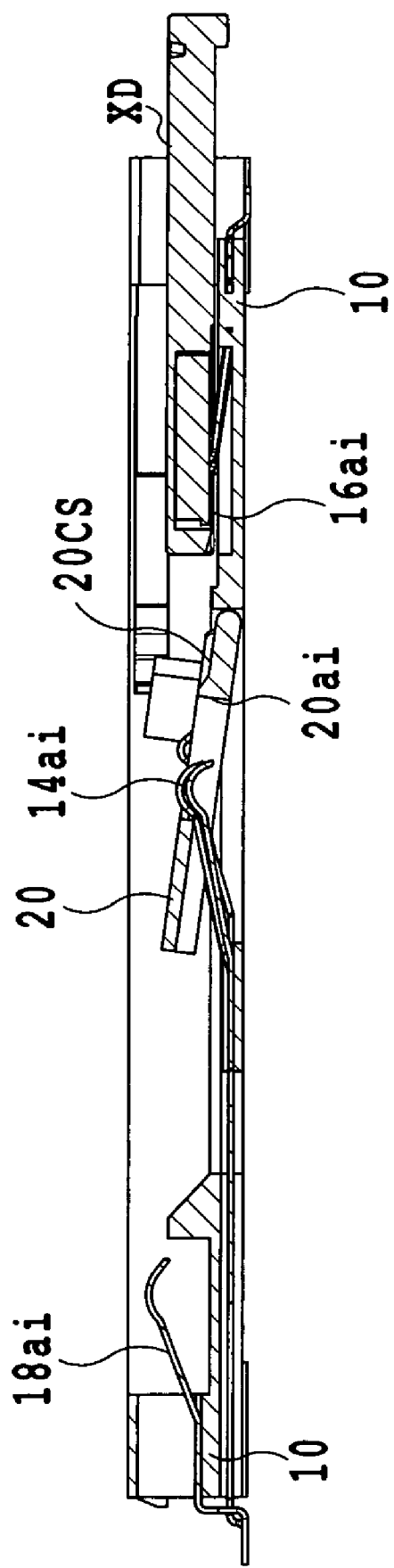
FIG. 25 is a cross-sectional view taken along the line XXV-XXV of FIG. 23.
Figure 26:
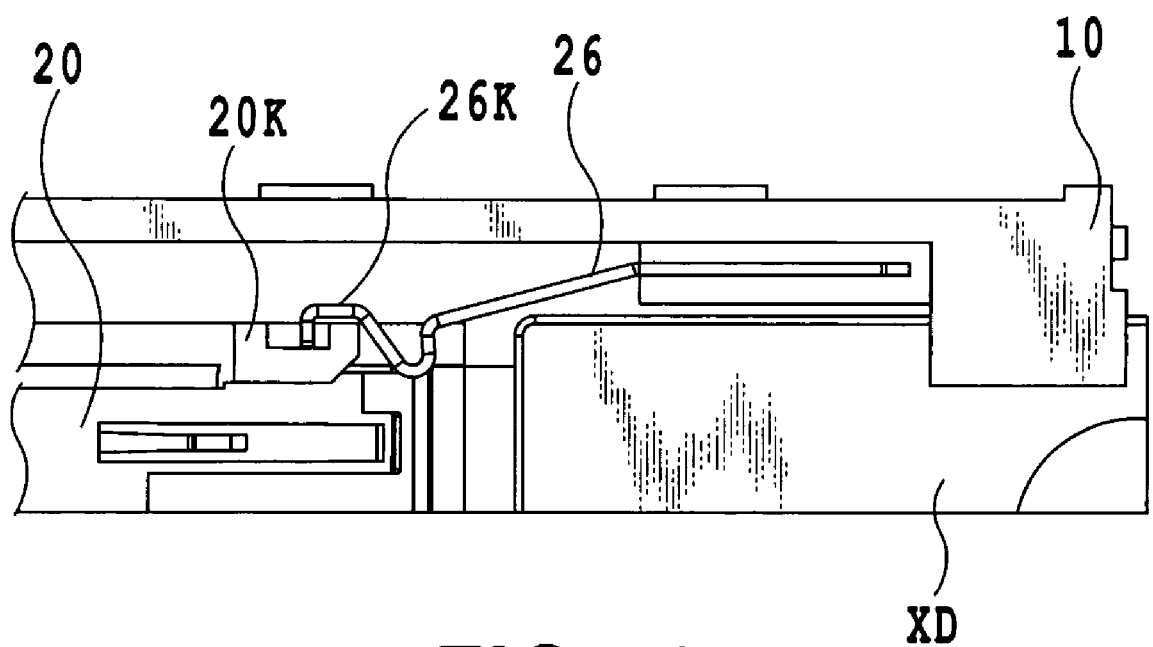
FIG. 26 is an enlarged partial plan view showing a structure of the contact pressing plate and the locking/unlocking hardware under the state shown in FIG. 23.

Further, when inserting the XD card XD, the front edge of the XD card XD is guided along the groove 10G2 upon passing through the card slot 8CS, thus to be inserted in the first section of the card accommodation portion, as shown in FIGS. 23 and 24. At that time, one of the side faces of the XD card XD is inserted without contacting the curved portion 26B of the locking/unlocking hardware 26. Then, when the pressing force is removed after the front edge of the XD card XD is kept retained by the step portion 22*a* of the ejector 22 and further pressed together with the ejector 22 against the biasing force of the coil spring (not shown), one end portion of the cam lever 24 is separated from the first guide groove to be engaged with the cam surface of the third guide groove. Namely, the ejector controller portion keeps the ejector 22 in the retaining state.

Accordingly, the XD card XD is retained in the first section of the card accommodation portion, and also the contact pad of the XD card XD and the contact portions of the contact terminals 16*ai* are made to touch to be electrically connected.

When removing the XD card XD, the mounted XD card XD is once pressed slightly further forward. At that time, advancing of the ejector 22 causes one end portion of the cam lever 24 to be released and separated from the cam surface and to be led to the second guide groove. Thus, the ejector 22 is pressed backward together with the XD card XD by the biasing force of the coil spring.

Then, upon pulling further outward the end portion of the XD card XD exposed outside the IC card connector, the XD card XD is removed.

Accordingly, in the foregoing embodiment, when mounting the MEMORY STICK MS for example, the tip portions of the contact portions of the contact terminals 14*ai* unused are pressed against by the unlocked contact pressing plate 20 up to a position where the contact portions do not interfere with the tip portion of the MEMORY STICK MS. Such a structure allows to prevent the contact portions of the contact terminals 14*ai* from being damaged, and since the contact pressing plate 20 is slidably and rotational movably disposed between a group of the contact terminal 18*ai* and a group of the contact terminal 16*ai*, the contact pressing plate 20 can be provided inside the IC card connector within a relatively small space. This permits reducing the overall length of the IC card connector provided with a multiple card accommodation.

The present invention has been described in detail with respect to preferred embodiments, and it will now be apparent from the foregoing to those skilled in the art that changes and modifications may be made without departing from the invention in its broader aspect, and it is the intention, therefore, in the apparent claims to cover all such changes and modifications as fall within the true spirit of the invention.

What is claimed is:

1. An IC card connector to be used in common for first and second IC cards of different dimensions via a common card inserting opening, comprising:
   a card accommodation portion including a front section for accommodating said first IC card and a rear section formed at a position farther from said card inserting opening than the front section so as to partially overlap with the front section for accommodating said dimensionally different second IC card;
   a group of front contact terminals and a group of a rear contact terminals disposed in the front section and the rear section respectively, for electrical connection with said first IC card and said second IC card respectively;
   a locking/unlocking mechanism fixed to the IC card connector, and
   a contact pressing plate which selectively presses the group of contact portions of the front contact terminals to rotate away from the first or second IC card;
   wherein when the first IC card is inserted, the locking/unlocking mechanism retains the contact pressing plate in a first position wherein the contact pressing plate can rotate, but not slide, and
   when the second IC card is inserted, the contact pressing plate can slide between the first position and a second position, and
   when the contact pressing plate is in the second position, the contact pressing plate can rotate.

2. An IC card connector, comprising:
   a multiple card accommodation including a first section for removably accommodating via a common card inserting opening a first IC card out of a plurality of IC cards of mutually different shapes, a second section for accommodating a second IC card, formed at a position farther from the card inserting opening than the first section in a line therewith and partially overlapping therewith, and a third section for accommodating a third IC card, formed at a position still farther from the card inserting opening than the first and the second sections, in a line therewith and partially overlapping therewith;
   a group of first contact terminals, a group of second contact terminals and a group of third contact terminals sequentially disposed in a loading/unloading direction of the IC card so as to correspond to the first section, the second section and the third section respectively, for electrical connection with the first IC card, the second IC card and the third IC card respectively;
   a contact pressing plate disposed midway between said group of the first contact terminals and the group of second contact terminals, said contact pressing plate being rotatable so as to press the group of contact portions of the second contact terminals down to a predetermined position or to release the group of contact portions from the predetermined position, said contact pressing plate further being slidable between a first position and a second position according to insertion or removal operation of the second IC card or the third IC card; and a locking/unlocking mechanism fixed to the IC card connector capable of retaining the contact pressing plate at the first position, wherein the contact pressing plate can rotate when in the first and second positions.

3. An IC card connector, comprising:

a multiple card accommodation including a first section for removably accommodating via a common card inserting opening a first IC card out of a plurality of IC cards of mutually different shapes, a second section for accommodating a second IC card, formed at a position farther from the card inserting opening than the first section in a line therewith and partially overlapping therewith, and a third section for accommodating a third IC card, formed at a position still farther from the card inserting opening than the first and the second sections, in a line therewith and partially overlapping therewith;

a group of first contact terminals, a group of second contact terminals and a group of third contact terminals sequentially disposed in a loading/unloading direction of the IC card so as to correspond to the first section, the second section and the third section respectively, for electrical connection with the first IC card, the second IC card and the third IC card respectively;

a locking/unlocking mechanism that retains said contact pressing plate selectively in a predetermined attitude; and a contact pressing plate slidably and rotational movably disposed midway between said group of the first contact terminals and the group of second contact terminals, so as to press the group of contact portions of the second contact terminals down to a predetermined position or to release the group of contact portions from the predetermined position according to insertion or removal operation of the second IC card or the third IC card, wherein the locking/unlocking mechanism comprises a locking/unlocking member disposed adjacent to the second section of said multiple card accommodation, having an end portion that selectively keeps an engaged state of retaining said contact pressing plate or a disengaged state of releasing said contact pressing plate according to insertion or removal operation of the second IC card and the third IC card, and a biasing member that biases said contact pressing plate in the disengaged state so as to keep the engaged state.

4. The IC card connector according to claim 3, wherein, when the second IC card is larger in width than that of the third IC card, upon mounting of the second IC card on the second section said locking/unlocking member keeps the disengaged state to cause said contact pressing plate to rotate and slide, thereby allowing the second IC card to be mounted on the second section.

5. The IC card connector according to claim 3, wherein, when the second IC card is larger in width than that of the third IC card, upon mounting of the third IC card on the third section said locking/unlocking member keeps the disengaged state to cause said contact pressing plate to rotate, thereby allowing the third IC card to be mounted on the third section.

6. An IC card connector to be used in common for first and second IC cards having different dimensions via a common card inserting opening, comprising:

a card accommodation portion including a first section for accommodating said first IC card and a second section for accommodating said second dimensionally different IC card;

a group of first contact terminals and a group of a second contact terminals disposed in the first section and the second section respectively;

a locking/unlocking mechanism fixed to the IC card connector, and a contact pressing plate that selectively presses the group of first contact terminals to rotate away from the first or second IC card, the contact pressing plate being slidable between a first position and a second position, wherein when the locking/unlocking mechanism retains the contact pressing plate in the first position, the contact pressing plate can rotate, but not slide, and when the contact pressing plate is in the second position, the contact pressing plate can rotate and slide.

7. An IC card connector as defined in claim 6, wherein said locking/unlocking mechanism includes a first portion fixed to said card connector and a second portion for selectively engaging said contact pressing plate.

8. An IC card connector as defined in claim 7, wherein said second portion of said locking/unlocking mechanism comprises a bent portion configured to engage with a recess formed in said contact pressing plate.

9. An IC card connector as defined in claim 7, wherein said first portion of said locking/unlocking mechanism is fixed to a side wall of said card accommodation portion.

10. An IC card connector as defined in claim 7, wherein said locking/unlocking mechanism includes a third portion, said third portion comprising a curved portion connecting said first portion to said second portion.

* * * * *